United States Patent
Nakamura et al.

(10) Patent No.: US 9,797,333 B2
(45) Date of Patent: Oct. 24, 2017

(54) APPARATUS FOR AND METHOD OF CONTROLLING FUEL INJECTION OF INTERNAL COMBUSTION ENGINE

(71) Applicant: HITACHI AUTOMOTIVE SYSTEMS, LTD., Hitachinaka-shi, Ibaraki-ken (JP)

(72) Inventors: Yoshitatsu Nakamura, Isesaki (JP); Tomoyuki Murakami, Isesaki (JP); Atsushi Murai, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/688,082

(22) Filed: Apr. 16, 2015

(65) Prior Publication Data

US 2015/0285177 A1 Oct. 8, 2015

Related U.S. Application Data

(62) Division of application No. 12/963,071, filed on Dec. 8, 2010, now abandoned.

(30) Foreign Application Priority Data

Dec. 14, 2009 (JP) ................ 2009-282946

(51) Int. Cl.
*F02D 41/30* (2006.01)
*F02D 41/34* (2006.01)
(Continued)

(52) U.S. Cl.
CPC ..... *F02D 41/3005* (2013.01); *F02D 13/0234* (2013.01); *F02D 41/062* (2013.01);
(Continued)

(58) Field of Classification Search
CPC ....... Y02T 10/44; Y02T 10/48; Y02T 10/123; F02D 41/402; F02D 41/065; F02D 41/40; F02N 11/0814
See application file for complete search history.

(56) References Cited

U.S. PATENT DOCUMENTS 7,472,016 B2 12/2008 Takeyama et al.
8,301,361 B2 * 10/2012 Hashimoto ......... F02D 41/0087
123/179.16
(Continued)

FOREIGN PATENT DOCUMENTS

JP 64-015443 A 1/1989
JP 2006-220141 A 8/2006
(Continued)

OTHER PUBLICATIONS

Chinese Office Action and English Translation of counterpart application No. 201010588417.6, dated Mar. 25, 2014, 15 pages.
(Continued)

*Primary Examiner* — Sizo Vilakazi
(74) *Attorney, Agent, or Firm* — Foley & Lardner LLP

(57) ABSTRACT

There is provided a configuration in which a cylinder which is in an inlet stroke when an internal combustion engine is in a stop (automatic stop) state is determined and stored, and when starting the engine upon detection of a start request, the fuel injection of an initial cycle to the cylinder, which has been determined as having been stopped in the inlet stroke when the engine was in the stop state before starting, is split into a plurality if injections at least including an injection before engine rotation, to thereby perform injections. As a result, startability is improved while suppressing pre-ignition at the time of starting.

16 Claims, 20 Drawing Sheets

(51) Int. Cl.
*F02D 41/40* (2006.01)
*F02N 11/08* (2006.01)
*F02D 13/02* (2006.01)
*F02D 41/06* (2006.01)
*F02D 41/00* (2006.01)

(52) U.S. Cl.
CPC ......... *F02D 41/065* (2013.01); *F02D 41/068* (2013.01); *F02D 41/345* (2013.01); *F02D 41/402* (2013.01); *F02N 11/0814* (2013.01); *F02D 41/061* (2013.01); *F02D 2041/001* (2013.01); *F02D 2200/021* (2013.01); *Y02T 10/44* (2013.01); *Y02T 10/48* (2013.01)

(56) References Cited

U.S. PATENT DOCUMENTS

2003/0222159 A1    12/2003    Kobayashi et al.
2008/0154484 A1*   6/2008     Takeyama ............. F02D 41/065 701/113
2011/0232605 A1*   9/2011     Ashizawa ............. F02D 35/026 123/445
2011/0239645 A1*   10/2011    Nagoshi ................. F02B 37/18 60/602

FOREIGN PATENT DOCUMENTS

| JP | 4099075 B2 | 3/2008 |
| JP | 2008-215192 A | 9/2008 |
| JP | 2008-240620 A | 10/2008 |
| JP | 2009-041460 A | 2/2009 |
| WO | WO-2008/107775 A1 | 9/2008 |

OTHER PUBLICATIONS

Chinese Office Action and English Translation of counterpart application No. 201010588417.6, dated Oct. 11, 2014, 12 pages.

* cited by examiner

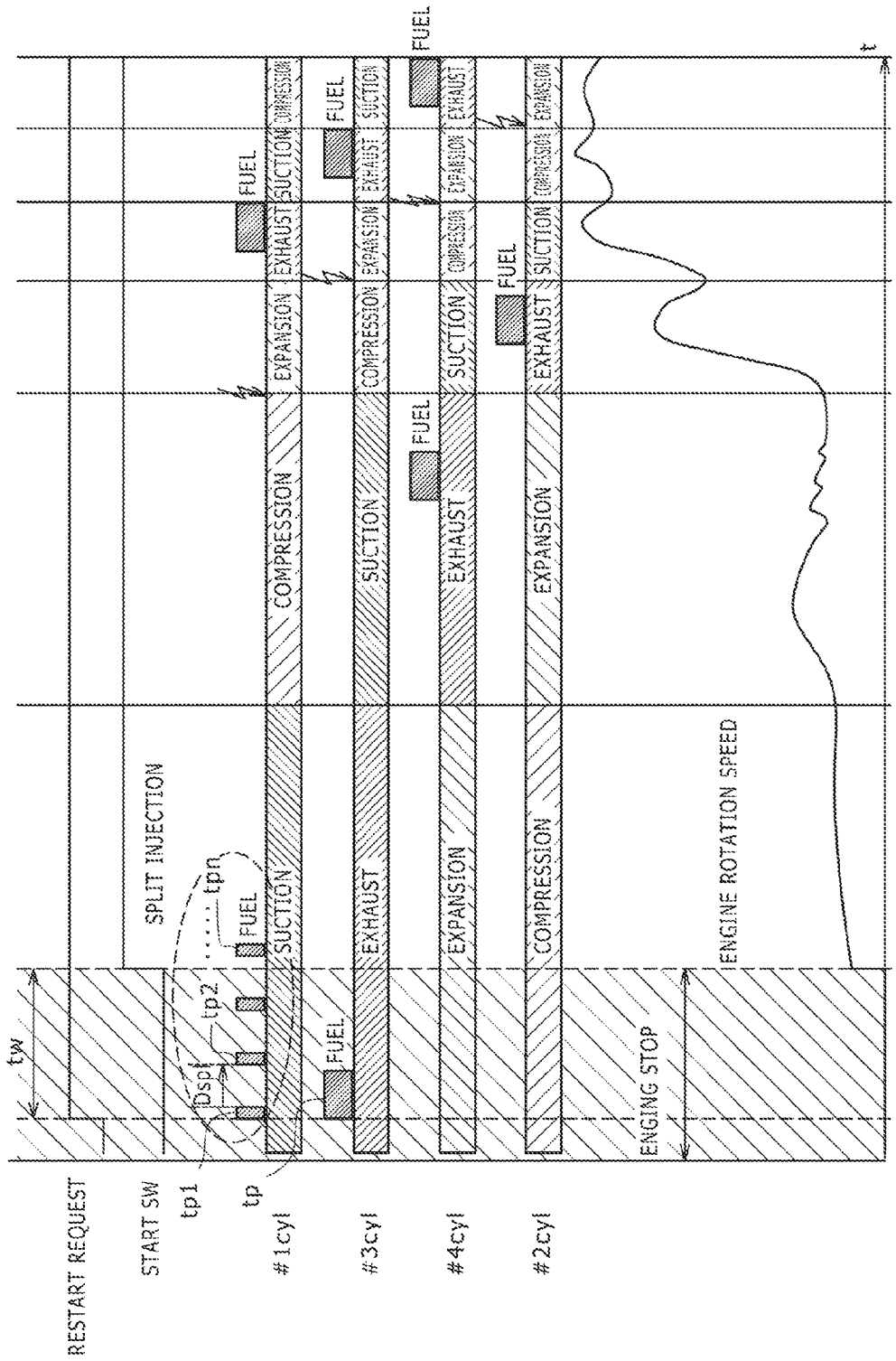

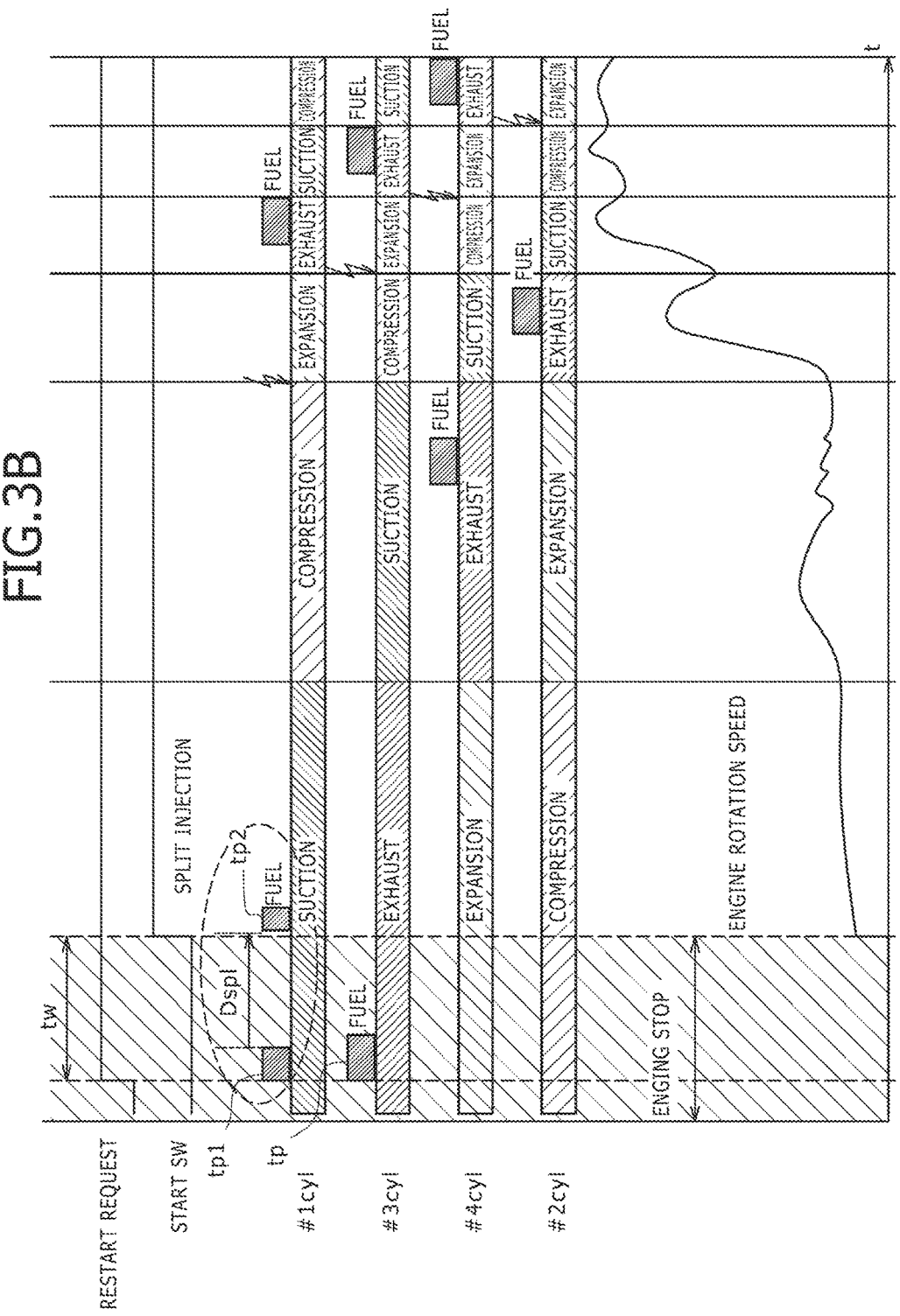

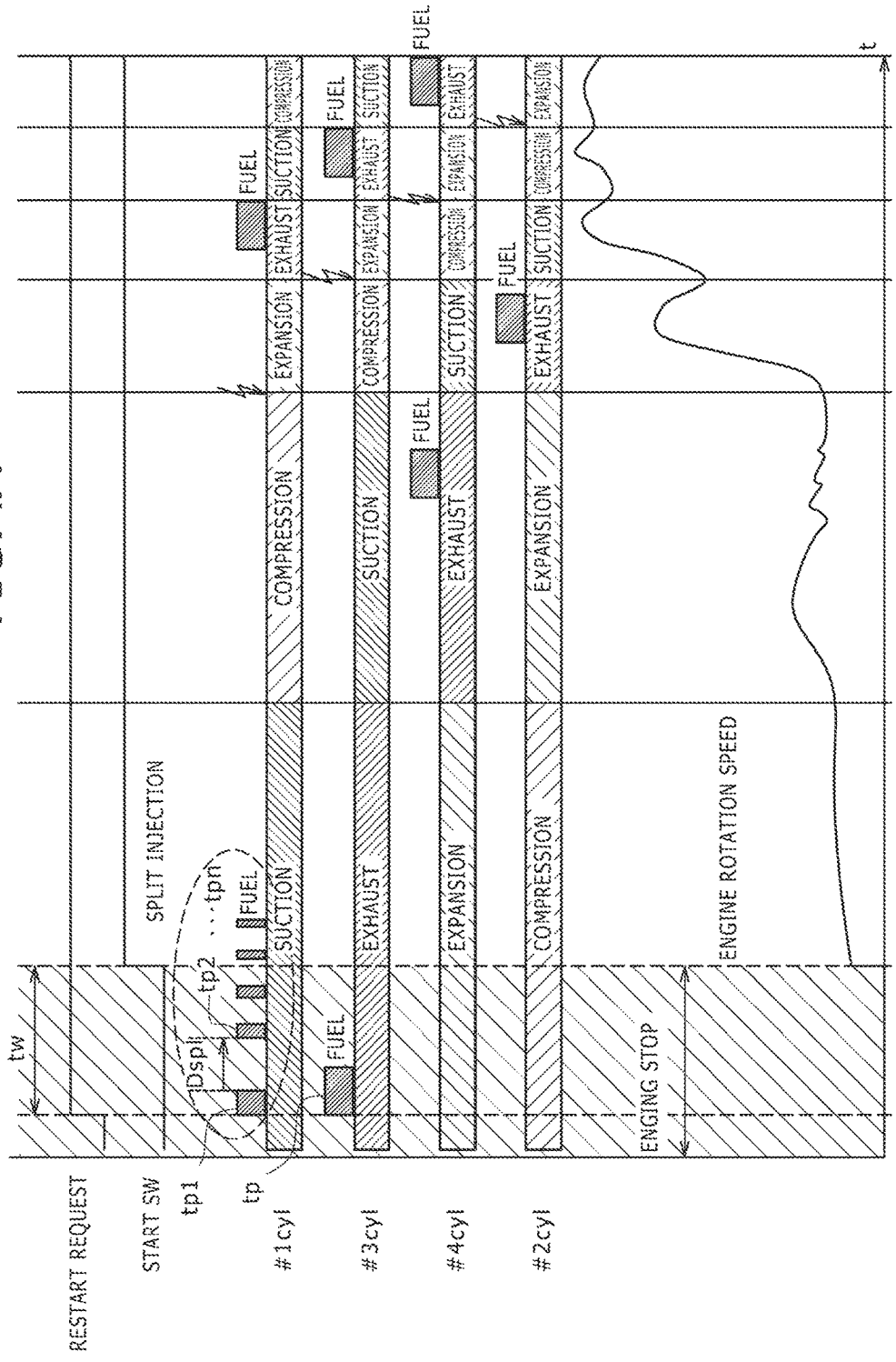

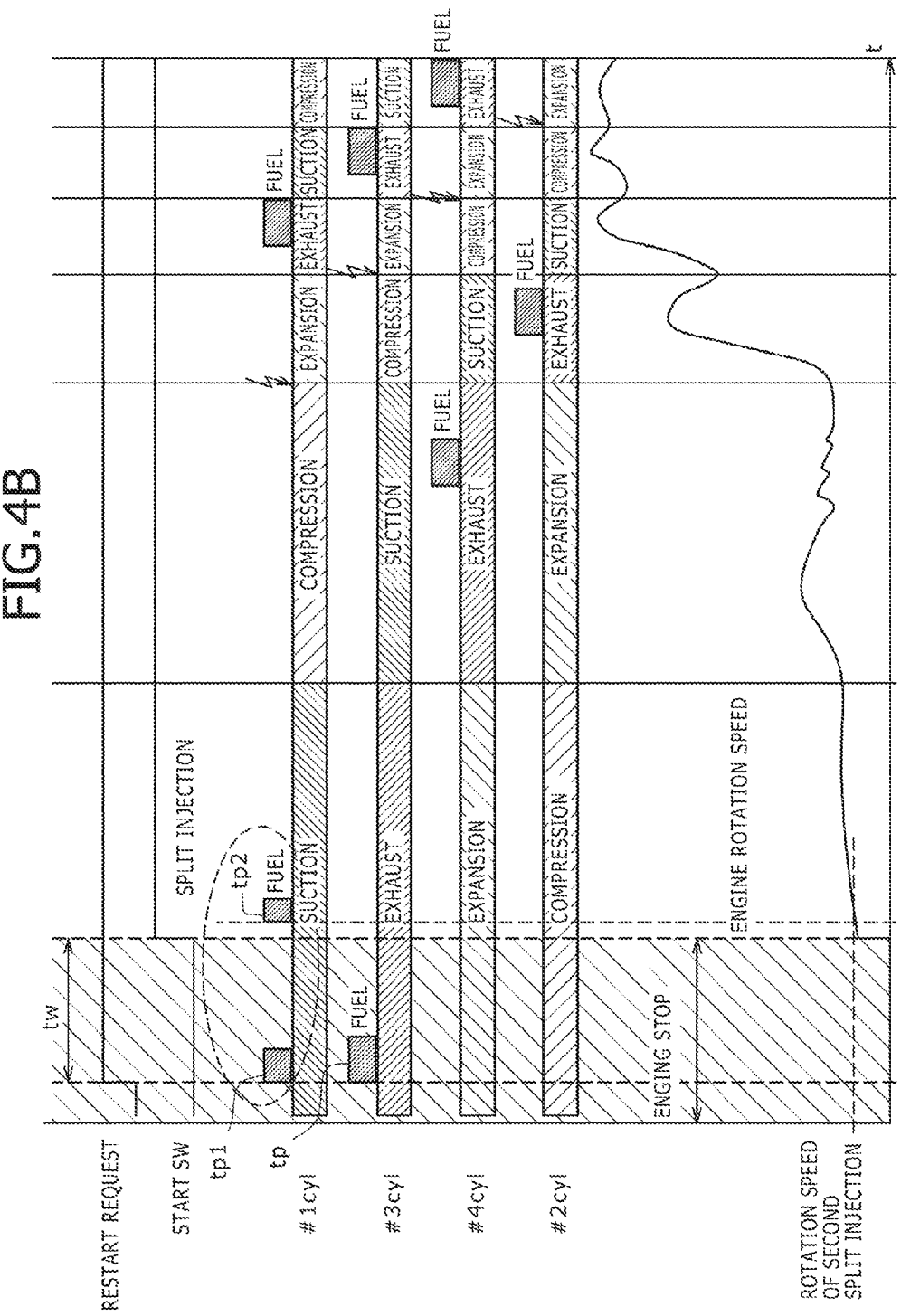

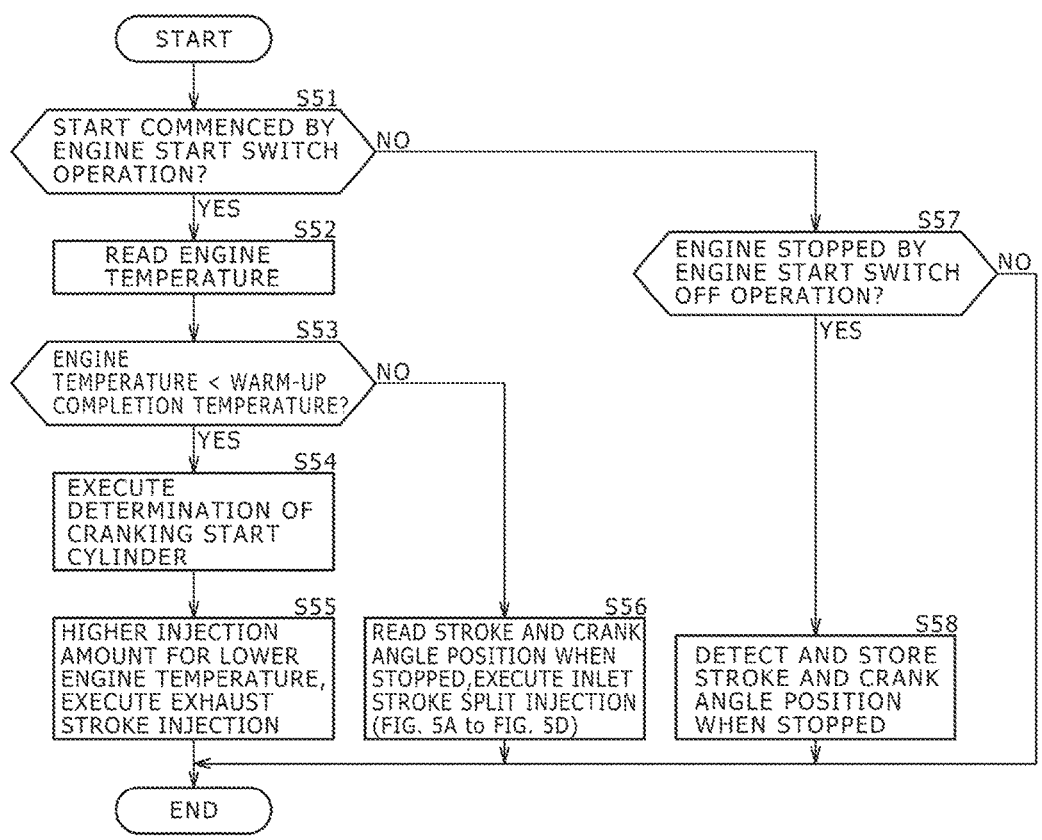

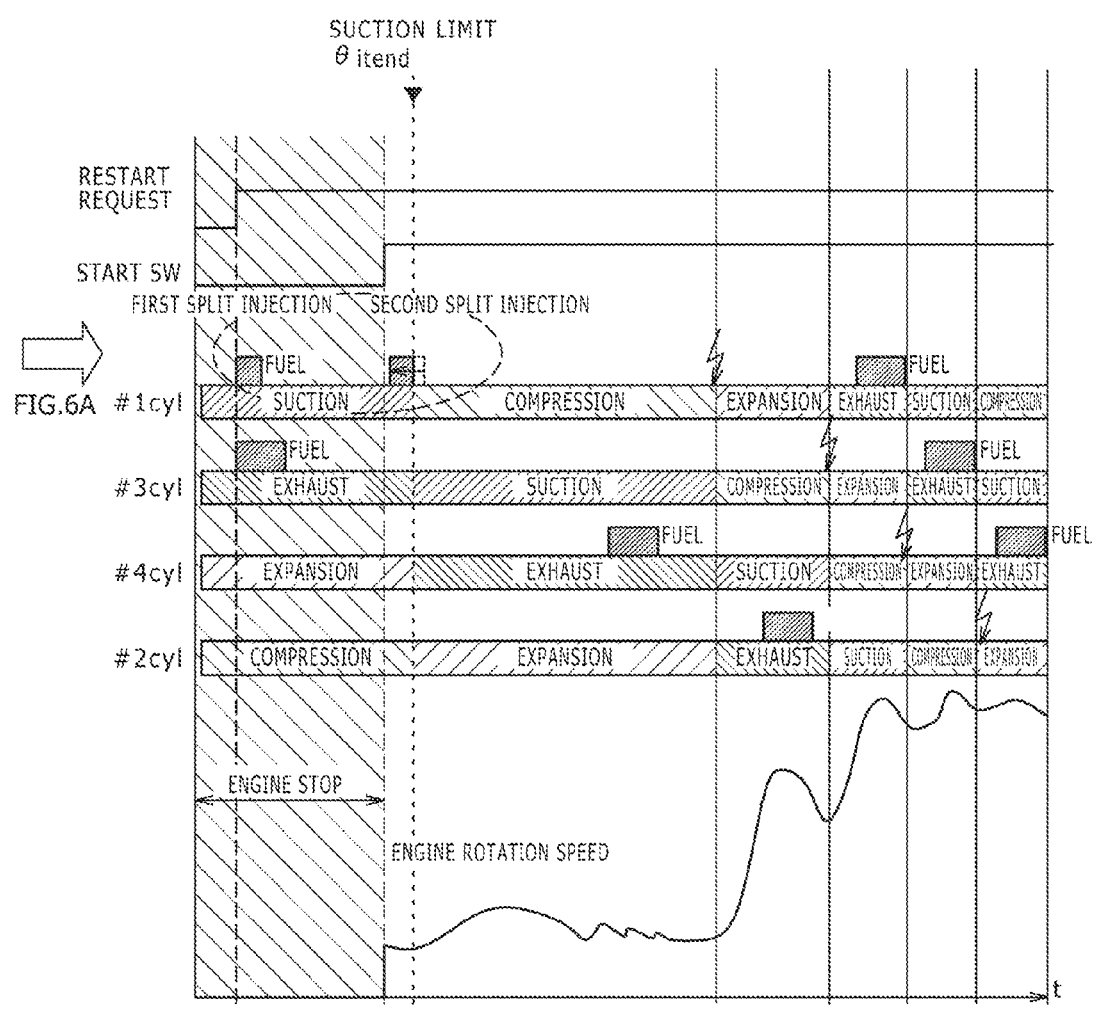

APPARATUS FOR AND METHOD OF CONTROLLING FUEL INJECTION OF INTERNAL COMBUSTION ENGINE

This application is a Divisional of U.S. patent application Ser. No. 12/963,071, filed Dec. 8, 2010, and claims priority to Japanese Patent Application No. 2009-282946, filed Dec. 14, 2009. The disclosures of the prior applications are incorporated by reference herein in their entirety.

FIELD OF THE INVENTION

The present invention relates to an apparatus for and a method of controlling fuel injection of an internal combustion engine, in particular, to fuel injection control performed when restarting an internal combustion engine which has been automatically stopped or when starting it in a warm-up completion state.

DESCRIPTION OF RELATED ART

Japanese Laid-open (Kokai) Patent Application Publication No. 2008-215192 discloses a fuel injection control apparatus of an internal combustion engine in which, at the time of restarting after completion of a warm-up operation (when restarting from an idle stop state for example) fuel injection is executed before starting (cranking), and the fuel injection amount during starting after engine rotation is reduction-corrected.

The above disclosed apparatus is of a configuration in which an injection amount required for starting is injected all at once in a state in which the engine is stopped before starting (before engine rotation).

However, in such a configuration in which the entire amount is injected at once, the penetration force (penetration) of fuel spray is high and injection is performed in a state in which there is no intake air flow towards the interior of a cylinder. Consequently, the amount of adhesion on the inlet air passage wall surface becomes high and the evaporation rate within the inlet air passage becomes reduced.

Therefore there is a possibility that the effect of cooling the interior of the inlet air passage by the latent heat of vaporization of the fuel spray may be reduced, and intake air of a comparatively high temperature may be introduced into a cylinder at the time of restarting the engine, consequently causing an auto-igniting phenomenon (pre-ignition) to occur.

SUMMARY OF THE INVENTION

Consequently, an object of the present invention is to suppress pre-ignition when restarting an internal combustion engine which has been automatically stopped, or when starting it in a warm-up completion state, and thereby improve startability.

In order to achieve the above object, the present invention is an apparatus for and a method of controlling fuel injection of an internal combustion engine for a vehicle in which fuel is injected from a fuel injection valve to an inlet port of each cylinder, wherein:

A. a cylinder which has been stopped in an inlet stroke is determined when the internal combustion engine is stopped;

B. a start request of the internal combustion engine is detected; and

C. when starting the engine based on the start request, fuel injection in the initial cycle to the cylinder, which was stopped in the inlet stroke, is split into a plurality of injections at least including an injection before engine rotation, to thereby perform injections.

The other objects and features of this invention will become understood from the following description with reference to the accompanying drawing.

BRIEF DESCRIPTION OF THE DRAWINGS

FIG. 3A is a time chart of a third embodiment, and FIG. 3B is a time chart of a fourth embodiment.

FIG. 4A is a time chart of a fifth embodiment, and FIG. 4B is a time chart of a sixth embodiment.

FIG. 5E is a flow chart of a seventh embodiment.

FIGS. 6A and 6B are time charts of an example of the second embodiment.

DESCRIPTION OF PREFERRED EMBODIMENTS

Hereunder, embodiments of the present invention are described, with reference to the accompanying drawings.

Figure 1:
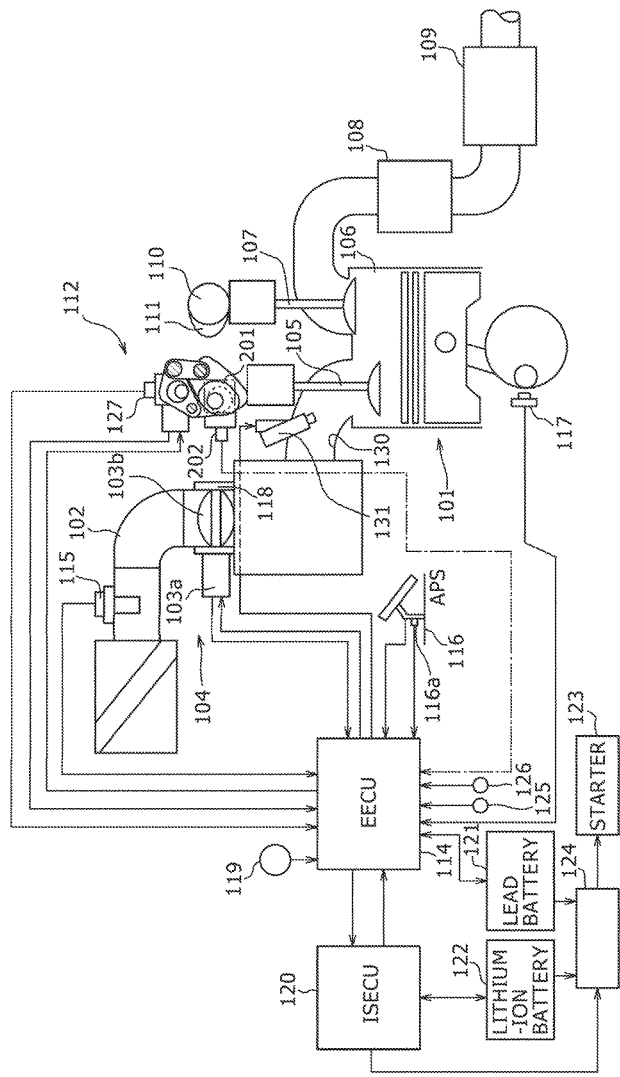
FIG. 1 is a configuration diagram of an internal combustion engine for a vehicle to which the present invention is applied.

FIG. 1 is a configuration diagram of an internal combustion engine for a vehicle to which the present invention is applied. On an inlet pipe 102 of an internal combustion engine 101 there is disposed an electronically controlled throttle 104 which drives a throttle valve 103b open and close, with a throttle motor 103a. Air is sucked into a combustion chamber 106 via electronically controlled throttle 104 and an inlet valve 105.

Exhaust gas is discharged from combustion chamber 106 through an exhaust valve 107, is purified in a front catalyst 108 and a rear catalyst 109, and is then discharged into the atmosphere.

Exhaust valve 107 is driven to open or close by a cam 111 supported on an exhaust side cam shaft 110, while maintaining a constant lift amount and a working angle (crank angle from open to close). On the other hand, regarding inlet valve 105, lift amount and working angle, that is, valve opening, can be continuously changed by a variable valve lift mechanism 112. The lift amount and working angle can be simultaneously changed so that when the characteristic of one is determined, the characteristic of the other is also determined.

On both end sections of an inlet side cam shaft, there are provided a variable valve timing mechanism 201 and an inlet side cam angle sensor 202. Variable valve timing mechanism 201 includes a mechanism which continuously performs variable control of rotational phase difference between the crank shaft and the inlet side cam shaft to thereby advance or retard the valve timing (valve opening/closing timing) of inlet valve 105. Inlet side cam angle sensor 202 detects a rotational position of the inlet side cam shaft.

An engine control electronic control unit (EECU) 114 controls electrically controlled throttle 104 and variable valve lift mechanism 112 depending on the opening of an acceleration pedal detected by an accelerator opening sensor APS 116. With this control, by using the opening of throttle valve 103b and the opening characteristic of inlet valve 105 it is possible to obtain a target intake air amount which corresponds to an accelerator opening ACC. Accelerator opening sensor APS 116 has a built-in idle switch 116a which detects an accelerator opening equal to or less than a predetermined opening, as an idle state (turned ON).

EECU 114 receives signal inputs from each of the following sensors as well as from accelerator opening sensor APS 116 and inlet side cam angle sensor 202. A rotation angle sensor 127 detects a rotational angle of a control shaft which is driven by an electric motor serving as an actuator of variable valve lift mechanism 112. Detection of the rotational angle of the control shaft corresponds to detection of the lift amount and working angle of the inlet valve. An airflow meter 115 detects an intake air amount Q of engine 101. A crank angle sensor 117 extracts engine rotation signals (a signal output at every unit angle and a cylinder determination signal output at every stroke phase difference) from the crank shaft. A throttle sensor 118 detects an opening TVO of throttle valve 103b. A water temperature sensor 119 detects a cooling water temperature Tw of engine 101. A vehicle traveling speed sensor 125 detects a vehicle traveling speed, and a brake sensor 126 detects an operating state (ON and OFF) of a brake.

Moreover, on an inlet port 130 on the upstream side of inlet valve 105 of each of the cylinders, there is provided an electromagnetic type fuel injection valve 131. Fuel injection valve 131 injects fuel, which has been adjusted to a predetermined pressure, toward inlet valve 105, when it is driven open by an injection pulse signal from EECU 114.

On the other hand, an idle-stop control electronic control unit (ISECU) 120 performs idle stop control which stops fuel injection of the internal combustion engine to thereby automatically stop its operation when the vehicle is stopped in an idle state (in a state in which the accelerator pedal is released), and performs control to restart the internal combustion engine when the operation has been automatically stopped and an occurrence of a restart request has been detected.

Moreover, as vehicle power supplies, there are provided a lead battery 121 and a lithium-ion battery 122. At restart after the internal combustion engine is automatically stopped, a starter 123 is activated using high-voltage lithium-ion battery 122. When starting the engine by manually operating a starter switch, low-voltage lead battery 121 is used to activate starter 123. ISECU 120 performs switching control of a switching relay 124 to thereby switch the battery to be used. ISECU 120 also performs control for maintaining the state of charge (SOC), the voltage, and the like of lithium-ion battery 122.

From EECU 114, ISECU 120 receives signals from sensors required for performing these controls such as idle switch 116a, vehicle traveling speed sensor 125, brake sensor 126, and the like, and it sends command signals for automatically stopping and restarting the engine to EECU 114, so as perform these controls.

EECU 114 determines and stores the cylinder which is in an inlet stroke when the internal combustion engine is automatically stopped (the cylinder in which a piston therein is stopped at an inlet stroke position. Hereunder, referred to as inlet stroke stopped cylinder), and the crank angle position of the inlet stroke stopped cylinder. When starting the engine based on the start request, fuel injection in the initial cycle with respect to the inlet stroke stopped cylinder is split into a plurality of injections at least including an injection performed before engine rotation, to thereby perform injections.

In this embodiment, there are provided two ECU units namely EECU 114 and ISECU 120, and control functions are assigned thereto, and consequently the size of individual ECU units can be made compact, thereby improving the degree of freedom in the layout thereof. However, of course the configuration may also be provided so as to perform both controls on a single ECU unit.

Next, there are described respective embodiments of fuel injection control, according to the present invention, for when restarting based on a start request after automatic stop. In the respective embodiments, in addition to a start request after automatic stop, a restart request after completion of a warm-up operation (an operation of a starting switch such as an ignition switch and a start switch performed by a driver) may be judged, and fuel injection control in restarting may be executed according to the respective embodiments.

When a predetermined idle stop condition (automatic stop condition) is satisfied, fuel injection of the internal combustion engine is stopped and the engine operation is automatically stopped. The predetermined idle stop condition includes a moment when depression of a brake pedal is detected in a vehicle stop state for example.

The vehicle stop state may be determined when a detection value VSP detected by the vehicle traveling speed sensor 125 is 0, or it is less than or equal to a predetermined value for determining a vehicle stop.

Moreover, detection of depression of the brake pedal may be determined as a state in which the brake pedal is depressed when a detection value of brake sensor 126 is greater than or equal to a predetermined value.

The brake sensor is of a configuration capable of detecting a depression amount of the brake pedal. However, a brake switch which detects a depression of the brake pedal as ON/OFF may also be adapted thereto, so that a depression of the brake pedal is determined when the brake switch is turned ON.

Moreover, in addition to the above idle stop condition, there may be set an idle stop condition by adding or combining conditions such as: it is in a warm-up completion state in which the engine cooling water temperature is greater than or equal to a predetermined value; the idle switch 116a is ON and the engine is determined to be in an idle operating state, or the engine rotation speed Ne is within a set rotation speed range in an idle state; and the state of charge of the battery is greater than or equal to a predetermined value which enables restarting.

After having performed the above automatic stop of the internal combustion engine, when there has been detected a restart request caused by a brake release or a depression of the accelerator pedal performed by the driver, that is to say, when the detection value of the brake sensor is less than or equal to the predetermined value, or when the brake switch OFF is detected or accelerator opening sensor APS 116 detects an accelerator opening greater than or equal to a predetermined value, which is outside the idle operation range, the fuel injection amount of each cylinder is set as follows.

First, at the time of automatic stop, the inlet stroke stopped cylinder is determined and stored, and the fuel injection amount at the time of restarting (hereunder, referred to as restart time injection amount) is split to perform injection a plurality of number of times. Here, the split injections in which the restart time injection amount is split into a plurality of number of times may be performed during a period from the opening timing of the inlet valve to the closing timing of the inlet valve.

Moreover, when the inlet valve closing timing is controlled by an operation of variable valve timing mechanism 201 and variable valve lift mechanism 112, to be after bottom dead center of the piston, and the engine is stopped, after the piston bottom dead center, even if the inlet valve is open when starting, the piston still rises after engine rotation. Therefore injected fuel is not easily sucked, and it becomes difficult to introduce the restart time injection amount into the cylinder.

Consequently, it is preferable that split injections are completed before bottom dead center of the piston which is on the advanced side of the inlet valve closing timing.

By completing split injections at the piston bottom dead center or before bottom dead center, the split injections are completed in a state in which the piston is descending, that is to say, in a state in which the speed of suction into the cylinder by the piston is comparatively high. Therefore, introduction of injected fuel into the cylinder becomes easier, and superior combustion can be performed, thereby improving startability.

It is more preferable that the split injections are completed before approaching the vicinity of 30° before bottom dead center. That is to say, a delay occurs after injecting fuel from the fuel injection valve until it is introduced into the cylinder. Therefore taking this delay into consideration, it is preferable that the timing at which the fuel injected from the fuel injection valve is introduced into the cylinder, is set as a limit timing of the split injection completion timing, and the split injections are completed before the limit timing is reached.

If in the vicinity of 30° before bottom dead center, the restart time injection amount can be introduced into the cylinder by performing split injections.

Moreover, when the inlet valve closing timing is controlled by an operation of variable valve timing mechanism 201 and variable valve lift mechanism 112 to be at or before bottom dead center of the piston, it is preferable that the split injections are completed before the closing timing.

Furthermore, in this case also, so that the injected fuel is introduced into the cylinder before the closing timing, it is preferable that the split injections are completed before the limit timing, which is set before the closing timing, taking into consideration the delay from injection from the fuel injection valve until introduction into the cylinder. As a result, introduction of the injected fuel into the cylinder becomes easier, and superior combustion can be performed, thereby improving startability.

Figure 2A:
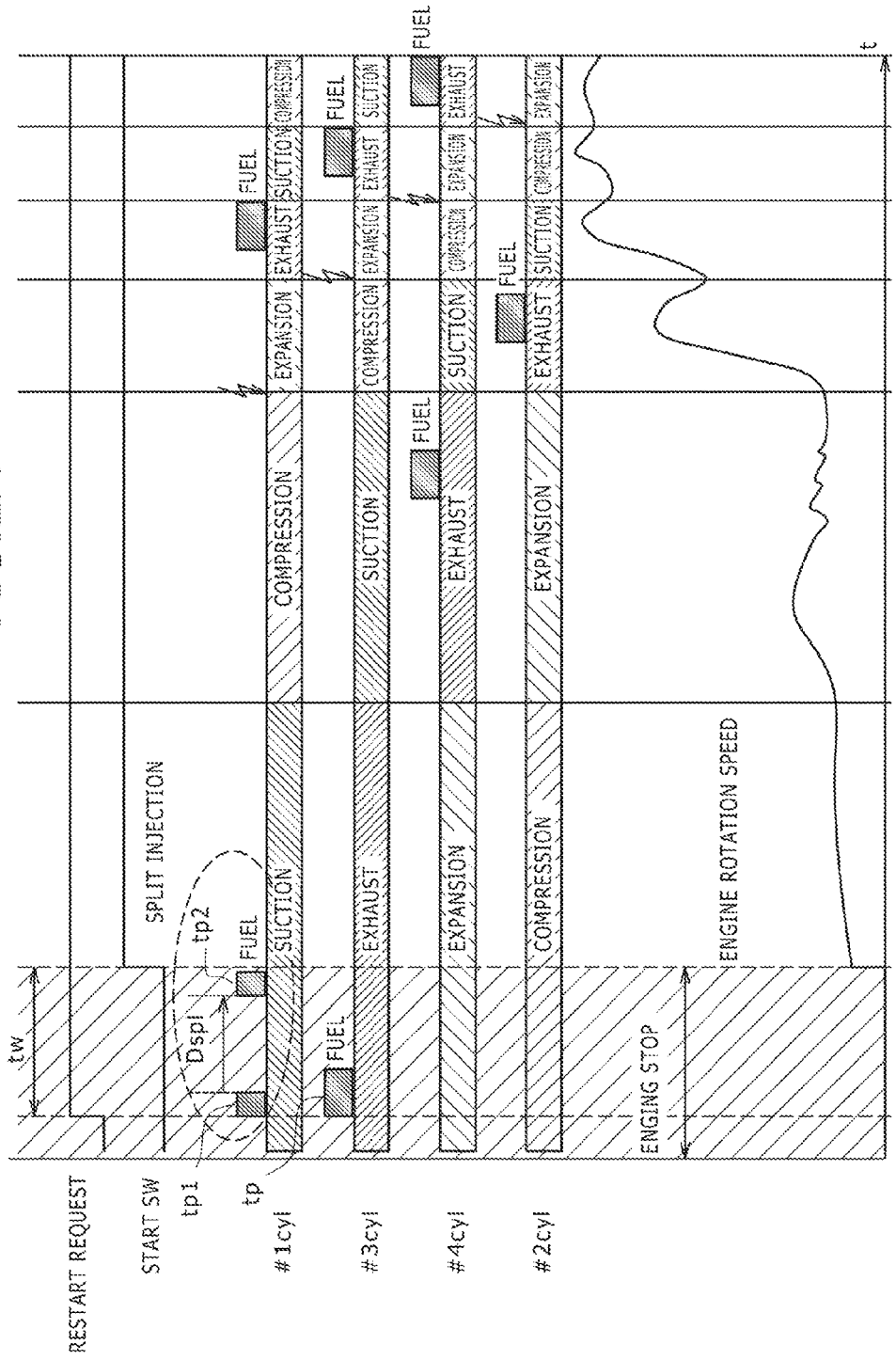
FIG. 2A is a time chart of a first embodiment.

FIG. 2A shows a time chart of a first embodiment (the horizontal axis t represents time).

In this embodiment, there is illustrated a case of performing split injection twice before engine rotation. Regarding the injection timing, injection timing of the initial injection is set immediately after a restart request has been detected, and injection timing of the second injection is set after a predetermined delay time Dspl has elapsed after completion of the initial injection.

The second injection timing is set so as to satisfy the following relationship so that the second injection is completed before engine rotation is commenced.

$$Dspl < tw - tp1 - tp2 = tw - tp \quad (1)$$

where, tw represents a set time from a moment when a restart request is made to a moment when the starter is activated and restarting (cranking) is commenced, tp1 represents the initial injection amount (injection time), and tp2 represents the second injection amount (injection time). Consequently, the starting time injection amount tp=tp1+tp2.

When tp1 equals tp2, then tp1=tp2=tp/2

As a result, in a cylinder which is in an inlet stroke immediately after a restart request has been made, superior combustion can be commenced as described below.

In the initial cycle after restarting, by splitting the starting time injection amount into a plurality of number of times including the injection before engine rotation, split injections are performed in single short injection times, and the resistance of air having no flow in the stop state becomes greater. Consequently, the penetration force of the fuel spray injected from the fuel injection valve becomes weak and the amount of fuel becoming attached to the inlet air passage wall surface is reduced, while the amount of fuel spay drifting inside the inlet air passage increases.

Here, regarding the inlet stroke stopped cylinder, since the inlet valve is open, the heat of high-temperature gas such as residual gas within the cylinder is transmitted to the inlet air passage side, and the air inside the inlet air passage is consequently excessively heated to a higher temperature compared to that of the inlet air passage wall. Therefore, the increased amount of fuel spray drifting inside the inlet air passage is exposed to the high-temperature air within the inlet air passage and becomes evaporated, thereby increasing the air cooling effect due to latent heat of vaporization. As a result, cooled inlet air is introduced into the cylinder when engine rotation is commenced. Therefore it is possible to suppress an increase in in-cylinder temperature in the compression stroke, and suppress the occurrence of pre-ignition.

Incidentally, comparing with the conventional technique disclosed in Patent Document 1 above, in the conventional technique, the whole amount of a start request fuel injection amount is injected all at once before the engine rotates. Therefore the penetration force of the spray is significant, and since there is no flow of the sucked air toward the interior of the cylinder, the amount of fuel spray drifting within the inlet air passage decreases, and on the other hand, the amount of the fuel which becomes attached to the inlet air passage wall surface increases. Therefore it is clear that the air cooling effect is low and the occurrence of pre-ignition cannot be easily suppressed.

The initial injection timing before engine rotation is preferably immediately after a start request has been made. In this way, it is possible to make the time to ignition timing or engine rotation longer, and thereby create a sufficient amount of evaporation time, thus enabling promotion of in-cylinder cooling.

On the other hand, the second injection timing is shown in the diagram as being when injection is completed immediately before engine rotation is commenced. However it is not limited to this timing. For example, preferably the second injection timing is set through experiment, simulation, or the like, to a timing where the cooling effect becomes greatest. The same applies to the ratio between the first injection amount and the second injection amount (split ratio).

Moreover, the configuration may be such that injections split into three times or more are performed before engine rotation. In this case, the single injection amount is reduced and the penetration force is further weakened. Therefore evaporation is facilitated and the effect of suppressing adhesion to the inlet port wall is also increased, so that the cooling effect of the air within the inlet port can be increased.

Next, there is described an embodiment in which, when restarting, an injection is performed before engine rotation, for the initial cycle of the inlet stroke stopped cylinder, as well as after commencing engine rotation.

Figure 2B:
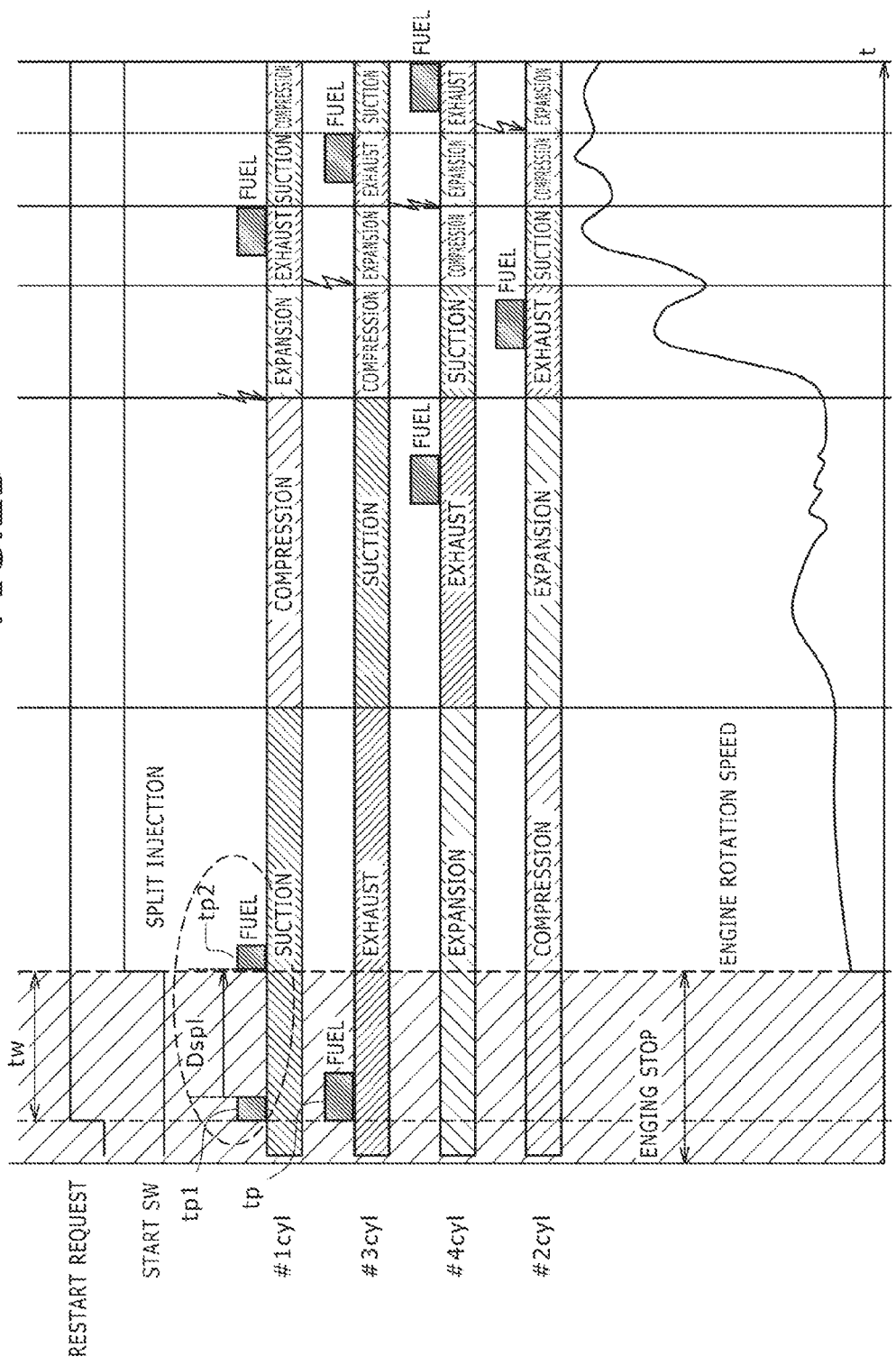
FIG. 2B is a time chart of a second embodiment.

In a second embodiment shown in FIG. 2B, an injection amount which is set by splitting injection into two (½ of the restart time injection amount) is injected respectively before engine rotation and after engine rotation. Regarding the injection timing, the injection commencing timing when the engine is stopped is set to an injection commencing timing of the initial injection immediately after the restart request has been detected. After completion of the injection when the engine is stopped, an injection commencing timing for injection after engine rotation is set after a predetermined delay time Dspl has elapsed, to commence the second injection.

Using the respective values in the expression (1), this is set so as to satisfy the following condition:

$$Dspl > tw - tp1 \quad (2)$$

Next, there is described an operation and effect of the second embodiment.

1) Regarding the inlet stroke stopped cylinder, since the inlet valve is open, the heat of high-temperature gas such as residual gas within the cylinder is transmitted to the interior of the inlet air passage, and the air inside the inlet air passage is consequently excessively heated to a higher temperature compared to that of the inlet air passage wall.

Consequently, the restart time injection amount is split and set for the cylinder which is in an inlet stroke immediately after the restart request has been made. The first split injection is executed in a state before the engine rotates, where there is no air flow and the air resistance is high. Consequently, the penetration force of the fuel spray injected from the fuel injection valve becomes weak and the amount of fuel becoming attached to the inlet air passage wall surface is reduced, while the amount of fuel spay drifting inside the inlet air passage increases. The increased fuel spray formed by the injection before engine rotation and having a weak penetration force is exposed to high-temperature air within the inlet air passage and evaporates, and consequently, the air cooling effect due to the latent heat of vaporization is increased. Then this cooled inlet air is introduced into the cylinder when engine rotation is commenced. Therefore it is possible to suppress an increase in the in-cylinder temperature in the compression stroke and suppress the occurrence of pre-ignition.

2) The fuel spray injected after engine rotation travels on the inlet air flow and is introduced into the cylinder, and the air-fuel mixture is dispersed and introduced into the cylinder while being diffused. The air-fuel mixture within the cylinder (concentration) becomes uniform, and the effect of suppressing pre-ignition occurrence is further increased.

FIG. 3A shows a third embodiment in which the number of splittings is set to three or more.

First, at the time of automatic stop, based on the piston position of the inlet stroke stopped cylinder, there is predicted a time tc from the moment when restart (cranking) of this cylinder is commenced to the moment when the inlet valve is closed. This prediction may be performed by experiment, simulation, or the like, and it may be set to a map or the like as a predicted time tc corresponding to each piston position (or a total time is with tw described later). Moreover, since the cranking speed varies according to parameters such as battery voltage, state of charge, and cooling water temperature, the predicted time tc may be corrected based on detection values of these parameters.

In an internal combustion engine in which the inlet valve closing timing is changed by an operation of variable valve timing mechanism 201 and variable valve lift mechanism 112 according to the engine operating state when it is in an idle stop state, the inlet valve closing timing at the time of restarting is found based on the operating status of variable valve timing mechanism 201 and variable valve lift mechanism 112, to thereby calculate the predicted time tc.

Moreover, as described above, when the inlet valve closing timing is controlled to be after bottom dead center of the piston by an operation of variable valve timing mechanism 201 and variable valve lift mechanism 112, the split injections are to be completed before inlet bottom dead center, or more preferably before approaching the vicinity of 30° before bottom dead center. Therefore, with consideration of a delay, which occurs after injecting fuel from the fuel injection valve until it is introduced into the cylinder, it is preferable that the timing at which the fuel injected from the fuel injection valve is introduced into the cylinder is set as a limit timing of the split injection completion timing, and the split injections are completed at or before the limit timing is reached. Therefore, in this case, the predicted time tc may be predicted as a time tc from the moment after commencing restarting (cranking) to the moment when the limit timing is reached.

Moreover, the split injections are completed within the time from the moment when the restart request is detected to the moment when the inlet valve is closed, or within the time in which the limit timing is reached. That is to say, the split injections are completed during the total time ts in which the predicted time tc until the inlet valve is closed after commencing the restarting (cranking) or until the limit timing is reached, is added to the set time tw from the moment when the restart request was made to the moment when the starter is activated and restarting (cranking) is commenced.

That is to say, the restart time injection amount tp is divided by the number of splits n to thereby set a single split injection amount, and a delay time Dspl which serves as a split injection interval time may be set so that the split injections are completed within the total time ts.

First, the number of splits n may be set to a preliminarily decided value (3 to 5 for example), however, it may also be variably set based on the above total time ts. For example, if the split number n is made high (low), then a single split injection amount becomes low (high), and the amount of evaporation time required for this single injection amount decreases (increases), however, the delay time Dspl also decreases (increases). Therefore, it is preferable that the delay time Dspl is made greater than the required evaporation time, and the split number n is set to a number where the evaporation efficiency of the entire restart time injection amount becomes highest.

Moreover, the injection commencing timing of the initial injection is set immediately after the restart request has been detected and a fuel injection is executed. Having completed the injection, split injections are executed for the decided split number of times when each delay time Dspl has elapsed.

Next, there is described an operation and effect of the third embodiment.

The third embodiment exhibits at least one of the following effects.

1) When performing split injections three times or more, if the number of injections before the engine rotates increases, the single injection amount is further reduced and the penetration force thereof is further weakened. Therefore evaporation is further facilitated. As a result, the effect of suppressing adhesion to the inlet port is also increased and the amount of fuel spray drifting within the inlet air passage increases. Therefore the cooling effect of the air within the inlet port due to the latent heat of vaporization, can be increased.

2) If the number of injections after engine rotation is increased, injection can be continued intermittently in the inlet stroke. Therefore, disproportion in the injection amount in the inlet stroke can be further reduced, and the uniformity of the air-fuel mixture within the cylinder can be further improved.

3) By reducing the injection amount in the vicinity of inlet stroke completion, an injection amount according to the reduced gas flow is achieved. Furthermore, the uniformity of the air-fuel mixture within the cylinder can be improved.

Also in the third embodiment, there can be achieved the operation and effects of increasing the effect of suppressing pre-ignition occurrence by: 1) the cooling effect of the air within the inlet port due to the injection before engine rotation having a weak penetration force; and 2) the uniformity of the air-fuel mixture in the cylinder achieved by the injection after engine rotation, which are the operation and effects disclosed in the second embodiment above.

FIG. 3B shows a fourth embodiment. In this embodiment, in a configuration in which a single injection before and after engine rotation, that is, a total of two injections are performed, the first injection amount before engine rotation is higher than the second injection amount after engine rotation.

Regarding the injection timing, the injection commencing timing when the engine is stopped is set to an injection commencing timing of the initial injection immediately after a restart request has been detected, to thereby perform an injection when the engine is stopped. After having completed the injection, an injection commencing timing for an injection after engine rotation is set after a predetermined delay time Dspl has elapsed, to commence the second injection.

Using the respective values in the expression (1), this is set so as to satisfy the following condition:

$$Dspl > tw - tp1 \qquad (2)$$

It is preferable that the amount of the initial fuel injection is set in a range in which evaporation is possible within the delay time Dspl. As a result, the fuel injection after having commenced engine rotation can be executed in a state in which the fuel of the initial injection has evaporated. That is to say, if the fuel spray of the initial fuel injection in a non-evaporated state impinges on the fuel spray injected after commencing engine rotation, the particle diameter thereof increases and consequently vaporization becomes more unlikely, so that promotion of vaporization by the latent heat of vaporization is reduced. On the other hand, by setting the delay time Dspl so that the fuel of the initial injection evaporates, such a reduction in promotion of vaporization can be suppressed.

Moreover, there may be provided a detection means which detects the temperature within the inlet air passage (inlet air temperature), and the initial fuel injection amount may be variably set according to the detected temperature in the inlet air passage.

In this case, the amount of fuel which can evaporate within the delay time Dspl can be made higher as the temperature within the inlet air passage becomes higher. Therefore the initial fuel injection amount is set to an even higher amount.

As a result, since a higher amount of fuel can be set to the initial fuel injection amount when the inlet air temperature is comparatively high, the effect of cooling due to the latent heat of vaporization can be increased, and the inlet air temperature within the inlet air passage can be reduced.

Detection of the temperature within the inlet air passage may be performed with a configuration provided with a temperature sensor within the inlet air passage, or the temperature of the cylinder interior may be detected directly or indirectly (estimated based on the cooling water temperature or the like), and the temperature within the inlet air passage then estimated based on the temperature of the cylinder interior.

Next, there is described an operation and effect of the fourth embodiment.

In this embodiment, the first injection amount before engine rotation where the vaporization time until introduction into the cylinder can be made long, is made greater than the second injection amount after engine rotation where the vaporization time is short, and thereby vaporization efficiency can be improved.

Also in this embodiment, there can be achieved the operation and effects of increasing the effect of suppressing pre-ignition occurrence by: 1) the cooling effect of the air within the inlet port due to the injection before engine rotation having a weak penetration force; and 2) the uniformity of the air-fuel mixture in the cylinder achieved by the injection after engine rotation, which are the operation and effects disclosed in the second embodiment above.

FIG. 4A shows a fifth embodiment. In this embodiment, in a configuration in which injections are split into three injections to be performed, the injection amount is made greater when the injection is performed earlier, and the injection amount is made less when the injection is made later.

When automatic stop is performed, as with the third embodiment, the split injection completion timing is controlled based on the piston position of the inlet stroke stopped cylinder. That is to say, a time tc from the moment after restarting (cranking) of the cylinder is commenced, to the moment when the inlet valve is closed, or a time tc until the limit timing, which was used in the third embodiment, is reached, is predicted. The split injections are completed during the total time is in which the predicted time tc is added to a time until the inlet valve is closed after detecting a restart request or until the limit timing is reached, that is, a set time tw from the moment when the restart request was made to the moment when the starter is activated and restarting (cranking) is commenced.

On the other hand, in this embodiment, an assigned ratio (%) of the individual split injection amounts is preliminarily set where the starting time injection amount is taken as 100%, and the starting time injection amount is multiplied by the assigned ratio to thereby set individual injection amounts. A greater assigned ratio is set higher when the order of injection is earlier, and the assigned ratio is set so that a higher injection amount is injected.

The number of splits n may be set to a preliminarily decided value (3 to 5 for example), however, it may also be variably set based on the above total time ts.

The delay time Dspl, which serves as a split injection interval time, may be set based on the restart time injection amount tp, the total time ts, and the split number n, so that the split injections are completed within the total time ts.

Moreover, the injection commencing timing of the initial injection is set immediately after the restart request has been detected, and a fuel injection is executed. Having completed the injection, split injections are executed the decided split number of times when each delay time Dspl has elapsed.

Furthermore the delay time Dspl may be simply set as a single value, with which the intervals of the respective split injections are equal. However, as another setting method, by having the delay time Dspl made longer for an earlier injection order, a longer vaporization time can be ensured and it is possible to suppress impingement on the fuel spray caused by the next split injection.

As a result, impingement of the fuel sprays between individual split injections can be suppressed, so that the reduction in the vaporization efficiency caused by the increase in particle diameter of the fuel spray due to impingement can be suppressed.

Next, there is described an operation and effect of the fifth embodiment.

In this embodiment, the injection amount is made greater for an earlier injection which allows prolonged vaporization time until introduction into the cylinder, and the injection amount is made less for a later injection in which vaporization time is short. Thereby vaporization efficiency can be improved.

Also in the fifth embodiment, there can be achieved the operation and effects of increasing the effect of suppressing pre-ignition occurrence by: 1) the cooling effect of the air within the inlet port due to the injection before engine rotation having a weak penetration force; and 2) the uniformity of the air-fuel mixture in the cylinder achieved by the injection after engine rotation, which are the operation and effects disclosed in the second embodiment above.

FIG. 4B shows a sixth embodiment. In this embodiment, an engine rotation speed (cranking speed) is detected after engine rotation has commenced, and when the rotation speed has reached a predetermined value, injection after engine rotation is commenced.

In this embodiment, an injection amount which is set by splitting the injection into two (½ of the restart time injection amount) is injected respectively before engine rotation and after engine rotation. Regarding the injection timing, the injection commencing timing when the engine is stopped is set to an injection commencing timing of the initial injection immediately after the restart request has been detected, and after completion of the injection when the engine is stopped, a split injection after engine rotation is executed when the engine rotation speed Ne is determined to be greater than or equal to a predetermined value.

This predetermined value is set for detecting engine rotation being actually commenced by commencement of cranking for example, and it is set to a value less than or equal to the rotation speed of the idle operation. The engine rotation speed may be calculated, for example, based on the angle at pulse occurrence of crank angle sensor 117 (for example, 10°) and pulse interval time when the pulse occurs.

The number of split injections before engine rotation may be a plurality of number of times. The number of split injections after engine rotation may also be a plurality of number of times. The delay time Dspl of injection intervals may be set so that the injection completion timing of the final injection becomes less than or equal to the limit crank angle θerst where effective injection can be performed after engine rotation.

Moreover, the injection amount of an earlier split injection may be made greater than that of a later split injection.

Next, there is described an operation and effect of the sixth embodiment.

In this embodiment, an actual engine rotation speed is detected, and injection is commenced when the engine rotation speed has increased and the flow velocity of inlet air into the cylinder has become high. Thereby, there is achieved an effect of promoting vaporization of the fuel spray and uniformity thereof inside the cylinder.

Incidentally, the injection completion timing of the injection after engine rotation (the final injection when performing split injections three times or more) needs to be completed before the inlet stroke is completed. Also in this case, as with the case of detecting a cylinder which is in an inlet stroke when automatic stop is performed, for example, even if, as described later, the inlet valve closing timing is set after the piston bottom dead center, by a variable valve actuation mechanism, it is preferable that the injection completion timing of the final injection after engine rotation, is set at or before the inlet bottom dead center. However, if there is a state in which the air-fuel mixture can be sucked into the cylinder after the inlet bottom dead center, by means of supercharging or the like performed by a supercharger during cranking, a completion timing of this suction (timing at which the effect of air-fuel mixture suction becomes insufficient) may be set as an injection completion timing in the final injection after engine rotation.

Hereunder, embodiments which include control of completing the above injection completion timing in the final injection after engine rotation, by the time of completion of the inlet stroke are described, with reference to the flow charts of FIG. 5A to 5D.

Figure 5A:
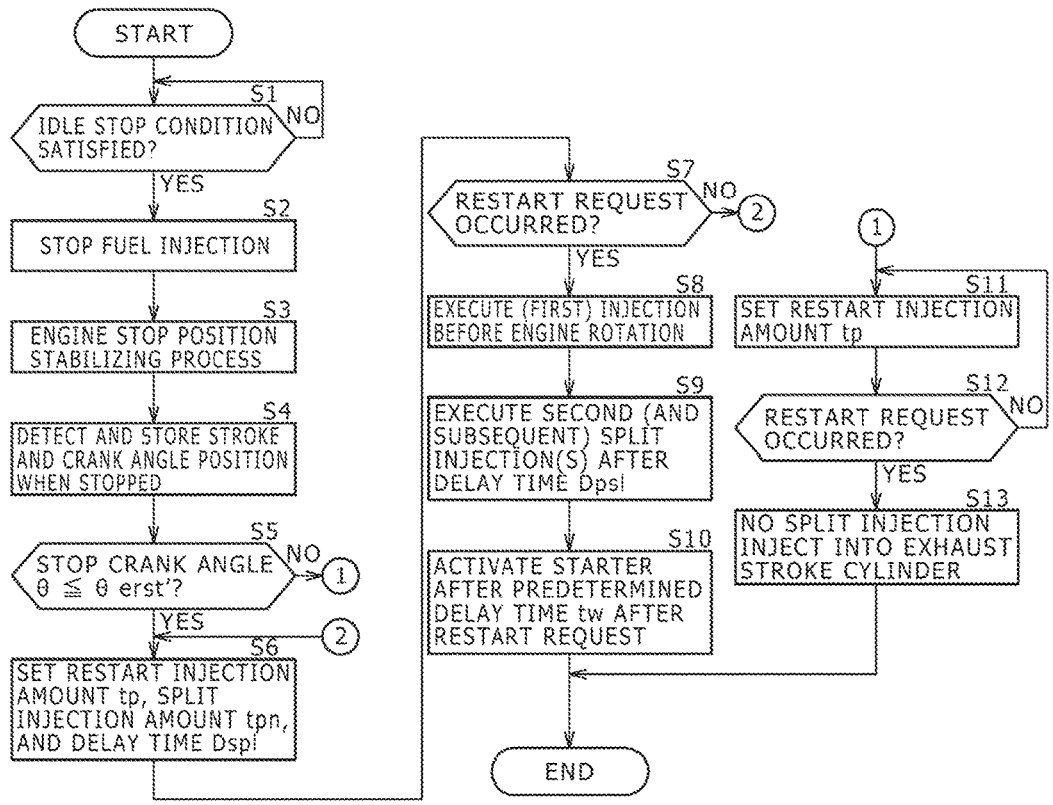
FIG. 5A is a flow chart of the first embodiment.

FIG. 5A corresponds to the first embodiment shown in FIG. 2A in which split injections are performed only before engine rotation.

In step S1, it is determined whether the predetermined idle stop condition described above is satisfied. If satisfied, control proceeds to step S2 in which fuel injection is stopped in order to automatically stop the internal combustion engine.

In step S3, there is executed a process of stabilizing the engine stop position. Specifically, the engine load (rotational resistance) is increased, for example, by fully opening the throttle opening, and thereby the piston position of each cylinder when the engine is stopped is stopped within a predetermined crank angle range, thereby suppressing variation in the stop position. As a result, more stable startability can be ensured. In addition to the procedure described above, an increase in the engine load can also be made by controlling; the lift amount and operating angle of the inlet valve, the valve timing, and the power generation of the alternator, and on a hybrid vehicle, by controlling the drive electric motor.

After engine rotation is stopped in the process of step S3, in step S4 a cylinder which is in an inlet stroke in a stop state is determined based on a signal from crank angle sensor 117, and also the piston position (crank angle position) of the inlet stroke stopped cylinder is detected, and stored in a backup memory.

In step S5, it is determined whether the stored crank angle θ of the inlet stroke stopped cylinder (the angle from the inlet top dead center) is less than or equal to a limit crank angle θerst' (advanced side). This limit crank angle θerst' is set as a limit crank angle θ at which the fuel spray within the inlet air passage split-injected before engine rotation after the engine is automatically stopped by an idle-stop control can be sufficiently sucked into the cylinder by the time of the inlet stroke completion after engine rotation. That is to say, even with the inlet stroke stopped cylinder, if the inlet stroke which remains after engine rotation is too short, the spray injected into the inlet air passage before engine rotation cannot be sufficiently sucked into the cylinder, and consequently it is difficult to commence a superior restart in this cylinder. Therefore, in this case, in order to prohibit split injections before engine rotation, the above determination is performed.

In step S5, if the crank angle θ of the inlet stroke stopped cylinder is determined to be less than or equal to the limit crank angle θerst', it is judged that the spray within the inlet air passage made by the split injection before engine rotation is sufficiently sucked after engine rotation.

Therefore, control proceeds to step S6 in which a restart time injection amount tp is set based on a water temperature, and this restart time injection amount tp is divided by the split number n to thereby calculate the injection amount tpn of each injection. At the same time, a delay time Dspl which serves as the interval time between the respective split injections is calculated.

Next, in step S7, an occurrence of a restart request such as a depressing operation of the accelerator is determined.

If it is determined in step S7 that a restart request has occurred, control proceeds to step S8, and a fuel injection before engine rotation (first injection) is commenced.

Subsequently, in step S9, after the injection is completed in step S8, a second split injection is performed after the delay time Dspl has elapsed. In a case in which split injection is performed three times or more, a subsequently split injection is performed after the delay time Dspl has elapsed after each split injection is completed, to thereby complete the split injection before engine rotation.

In step S10, after the restart request has occurred, the starter is activated after a predetermined delay time tw has elapsed, and engine start (cranking) is commenced.

On the other hand, if the crank angle θ of the inlet stroke stopped cylinder is determined to be greater than the limit crank angle θerst' (retarded side) in step S5, it is judged that split injection cannot be performed in this cylinder.

In this case, control proceeds to step S11 in which a restart time injection amount is set, and after having determined the restart request being satisfied in step S12, in step S13, the set restart time injection amount of fuel is injected at once into the cylinder which has been stopped in an exhaust stroke.

Figure 5B:
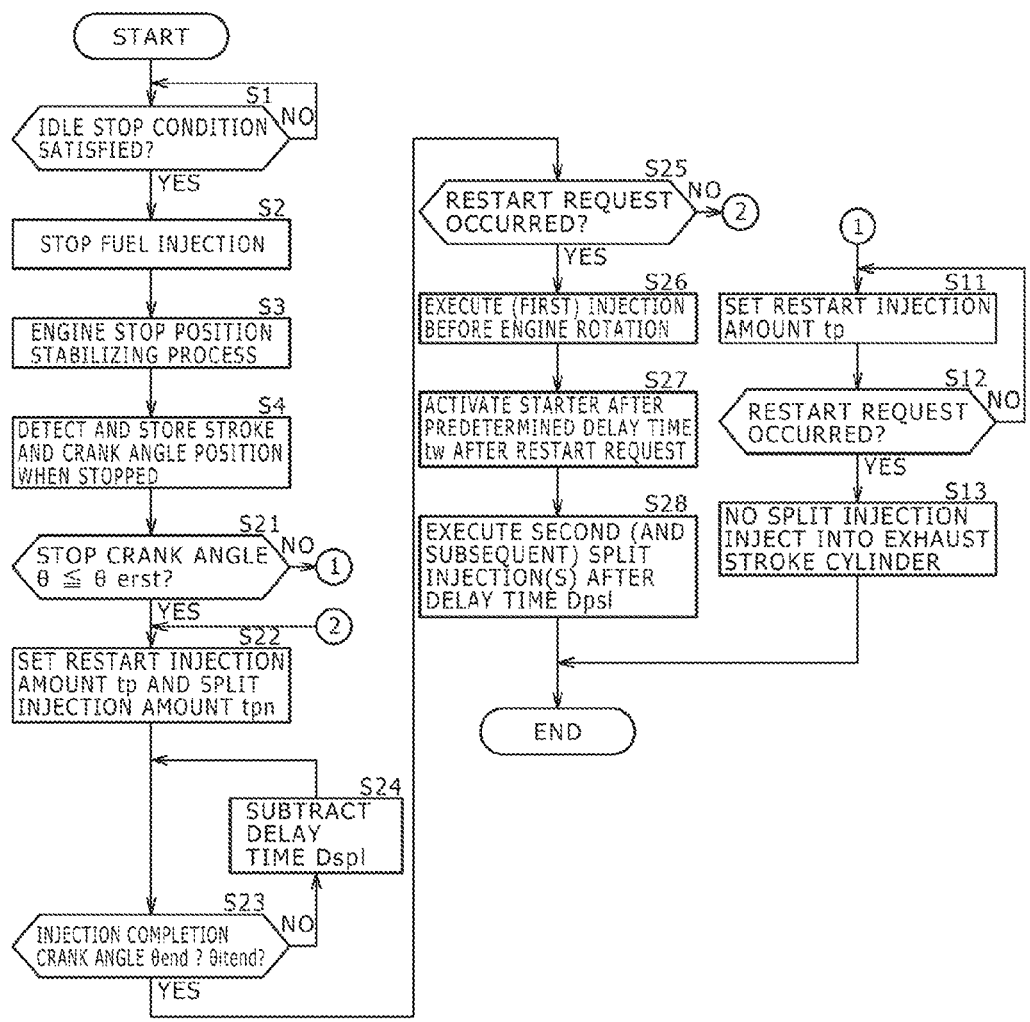
FIG. 5B is a flow chart of the second and fourth embodiments.

FIG. 5B shows a flow of the embodiment in which a single split injection is respectively performed before and after engine rotation.

Step S1 to step S4 are similar to those in FIG. 5A in that when a predetermined idle stop condition is satisfied, fuel injection is stopped in order to automatically stop the internal combustion engine, and after having executed a process of stabilizing the engine stop position, the inlet stroke stopped cylinder is determined, and the piston position thereof (crank angle position) is detected and stored.

In step S21, it is determined whether the stored crank angle θ of the inlet stroke stopped cylinder is less than or equal to the limit crank angle θerst at which a split injection, in particular, an effective injection after engine rotation can be performed when restarting.

If it is determined in step S21 that the crank angle θ of the inlet stroke stopped cylinder is less than or equal to the limit crank angle θerst, control proceeds to step S22.

In step S22, a fuel injection amount at the time of restarting (hereunder, referred to as restart time injection amount) is set based on water temperature, and also use of the split injection method is determined, and the restart time injection amount tp is divided by the split number (twice) to thereby calculate the split injection amount tpn of each injection.

As described above, in the second embodiment shown in FIG. 2B, the amount of two split injections tpn is set equal (tp1=tp2=tp/2), and in the fourth embodiment shown in FIG. 3B, the first injection amount tp1 (before engine rotation) is set to an amount greater than the second split injection amount tp2 (after engine rotation).

For example, in a case in which the injection commencing timing of the second split injection is set immediately after commencement of restarting (cranking), then in accordance with this setting, a delay time Dspl, which serves as an injection interval time from the completion of the first injection to the commencement of the second injection, is initially set as shown in the following expression.

$$Dspl=tw-tp1 \quad (3)$$

Next, in step S23, in the above split injections, an injection completion timing θend of the second injection after engine rotation, which has been found based on the split injection amounts tp1 and tp2 of the respective injections and the initial injection interval value (delay time Dspl), is compared with a limit crank angle (air-fuel mixture suction limit crank angle) θitend at which the effect of air-fuel mixture suction can be maintained at an excellent level.

The air-fuel mixture suction limit crank angle may normally be the inlet bottom dead center as described above. However, this may be at the inlet valve closing timing when the inlet valve closing timing is after the inlet bottom dead center in a case of performing supercharging with use of a supercharger.

Moreover, the limit crank angle (limit timing) θitend may be set based on the operating state of variable valve timing mechanism 201 and variable valve lift mechanism 112 when the engine is in a stop state, that is to say, it may be set based on the closing timing of the inlet valve.

Furthermore, the air-fuel mixture suction limit crank angle θitend set based on these may be set as a crank angle on the advanced side to the inlet bottom dead center or the inlet valve closing timing described above, with consideration of the delay from the moment of fuel injection to the moment of introduction into the cylinder.

If θend>θitend is determined in step S23, the delay time Dspl of split injection is reduction-corrected in step S24 so that θend θitend is satisfied. Subsequently, control proceeds to step S25 in which it is determined whether an engine restart request has occurred in a state in which the engine is automatically stopped.

By setting the fuel injection amount at the time of restarting in the automatic stop state in this manner, calculation delay can be suppressed, fuel injection delay in response to the restart request can be reduced, and the starting time can be reduced, thereby improving startability, compared to the case of calculating a fuel injection amount after a restart request has been detected.

If it is determined in step S25 that a restart request has occurred, control proceeds to step S26, and a fuel injection before engine rotation stop (first injection) is commenced.

In step S26, after the restart request has occurred, the starter is activated after a predetermined delay time tw has elapsed, and engine start (cranking) is commenced.

In step S27, after completion of the first injection before engine rotation, the second fuel injection after engine rotation is performed after the delay time Dspl has elapsed, and then this routine ends.

Here, if step S23 determines at the beginning that θend θitend is satisfied and the delay time Dspl is an initially set value, a fuel injection after engine rotation is commenced, after engine rotation (cranking) has been commenced by starter activation.

Figure 6A:
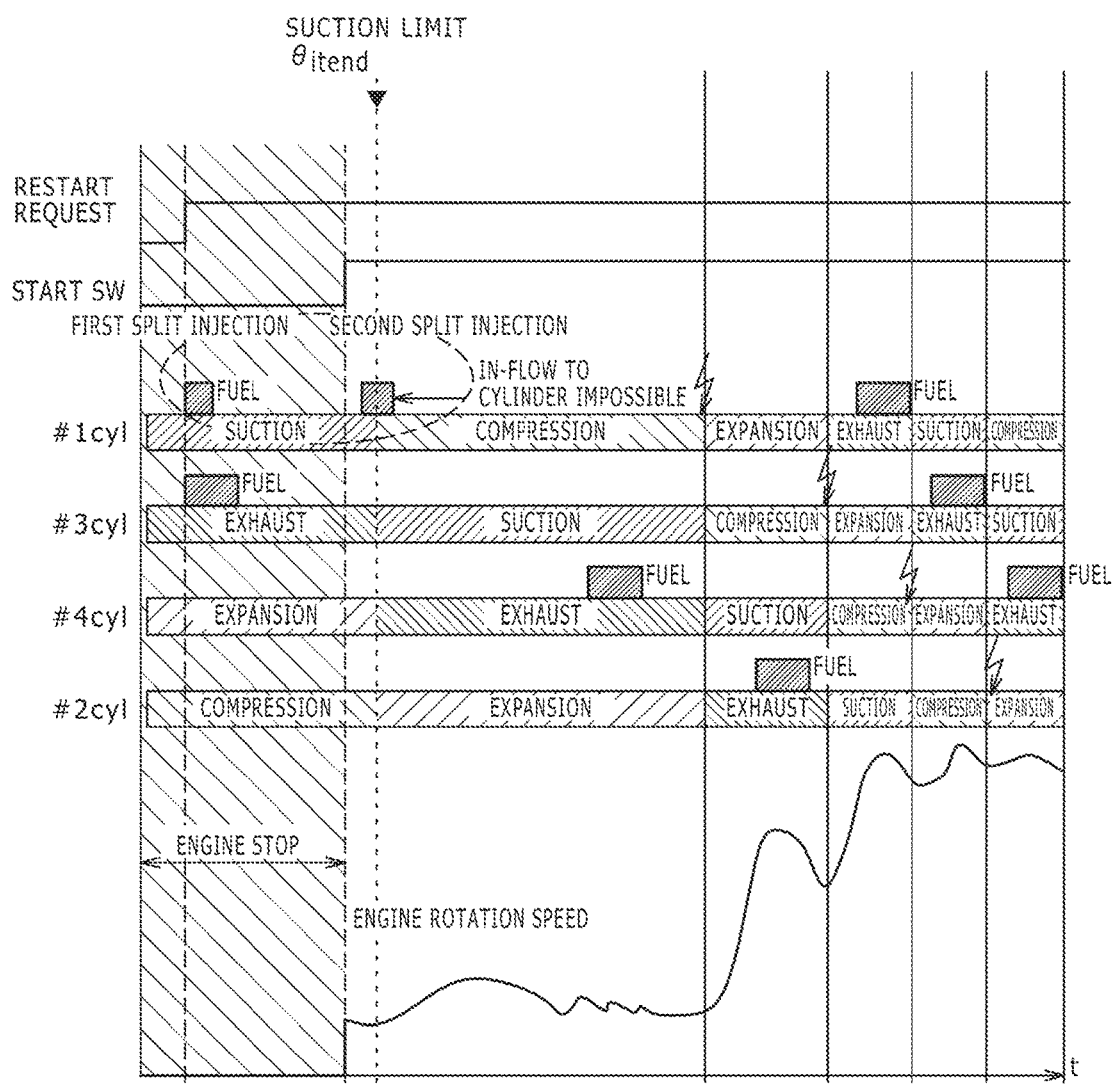

On the other hand, in a case in which it is determined in the beginning that θend>θitend is satisfied as shown in FIG. 6A and the delay time Dspl has been reduction-corrected, the second injection commencing timing is brought to a earlier timing as shown in FIG. 6B. Therefore, if the amount of reduction correction is high, fuel injection is commenced before engine rotation, and the injection may end after engine rotation in some cases.

By making the injection intervals smaller in this way, split injections are executed in the inlet stroke stopped cylinder to the greatest possible extent and prompt combustion is commenced, and thereby the start completion time can be reduced and startability can be improved.

Figure 7A:
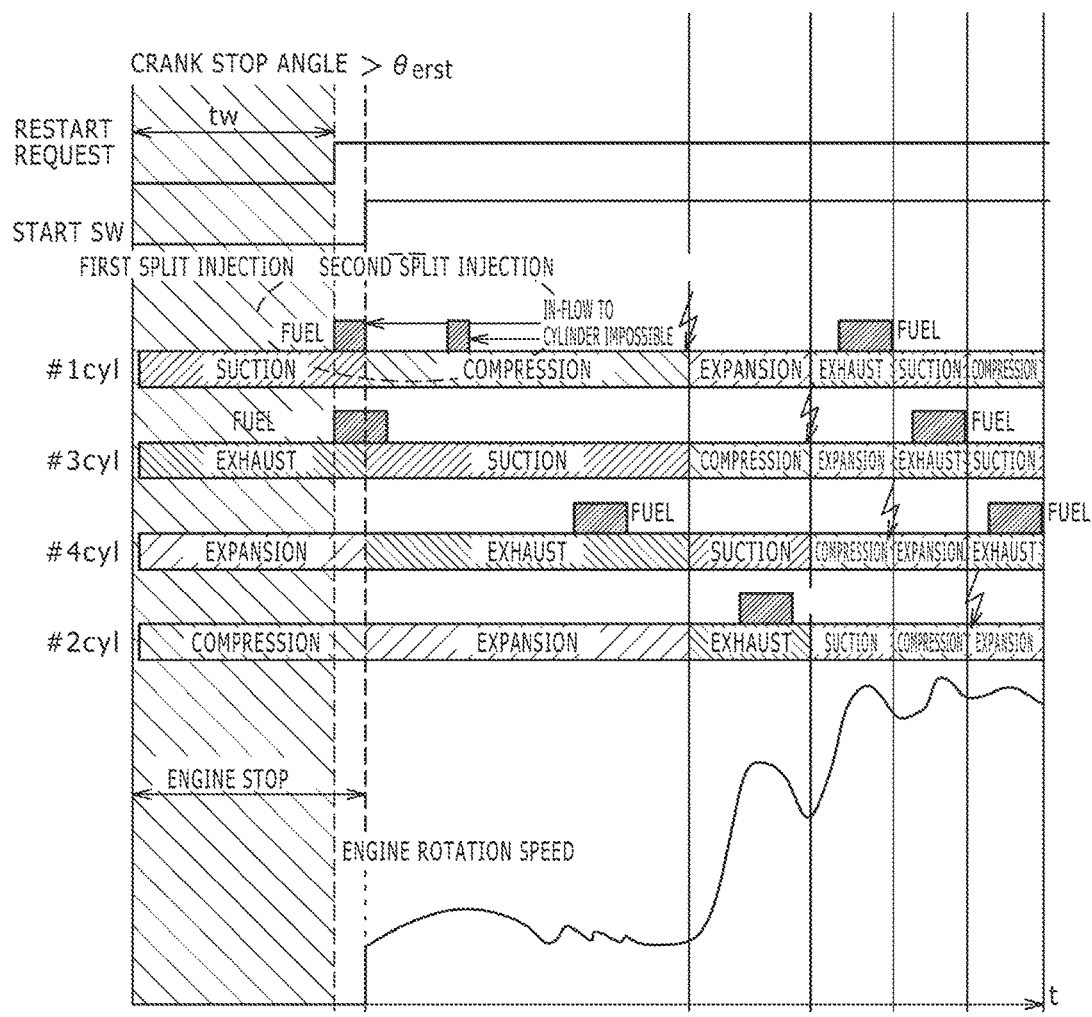
FIGS. 7A and 7B are time charts of another example of the second embodiment.
Figure 7B:
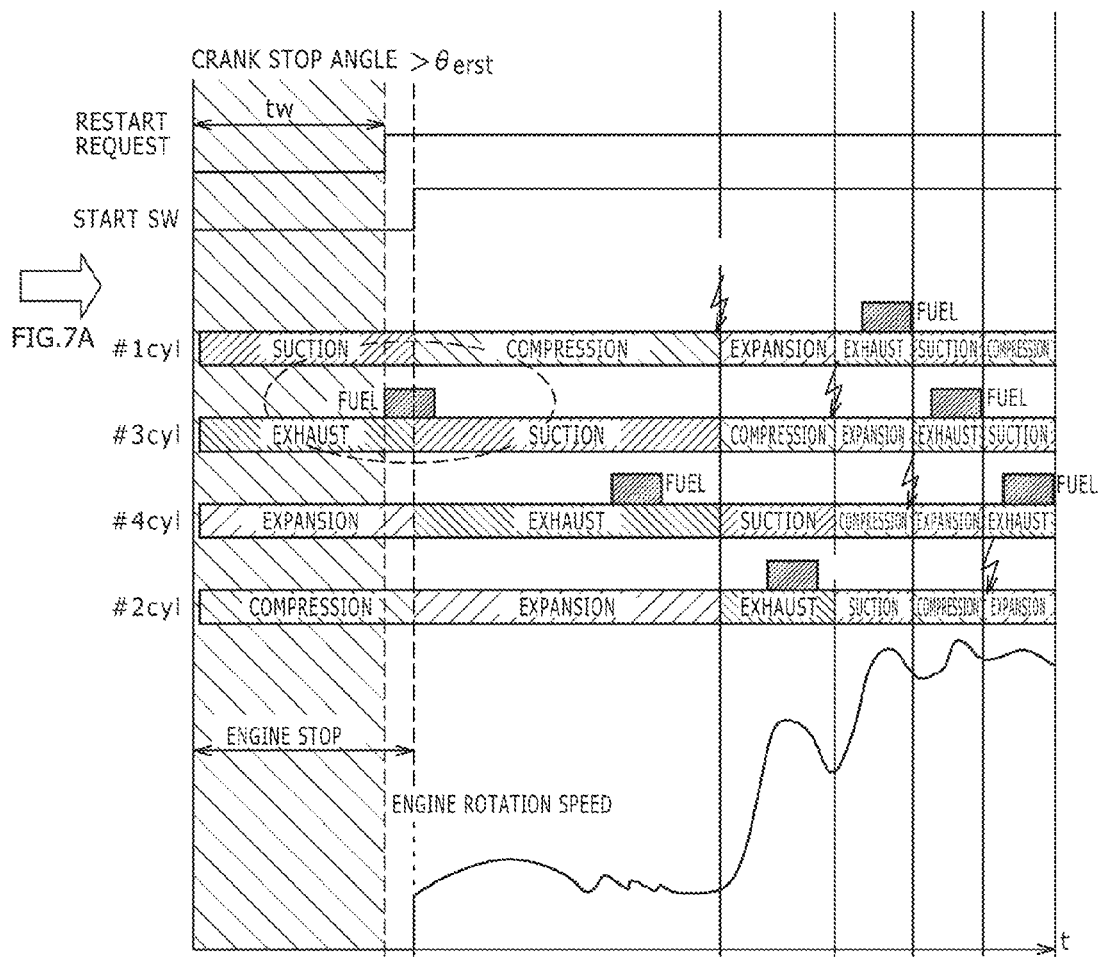

Moreover, if the crank angle θ of the inlet stroke stopped cylinder is determined to be greater than the limit crank angle θerst in step S21 as shown in FIG. 7A, it is judged that split injection cannot be performed in this cylinder. Then, control proceeds to step S11 in which a restart time injection amount is set, and after having determined the restart request being satisfied in step S12, in step S13, the set restart time injection amount of fuel is injected into the cylinder which has been stopped in an exhaust stroke as shown in FIG. 7B.

If a fuel injection is also performed in a case in which, even if fuel has been injected into the inlet stroke stopped cylinder, suction of the injected fuel can be hardly done in the inlet stroke, and consequently combustion is not performed, then in the subsequent inlet stroke, a highly concentrated air-fuel mixture is sucked along with the fuel re-injected in the immediately prior exhaust stroke, and consequently a misfire may occur, or the rotation speed may drop due to insufficient output power in some cases.

In a case in which injected fuel can be hardly sucked in the inlet stroke as with the present embodiment, by stopping (prohibiting) fuel injection into the cylinder, the above misfire and drop in rotation speed can be suppressed, and startability can be stabilized.

Figure 5C:
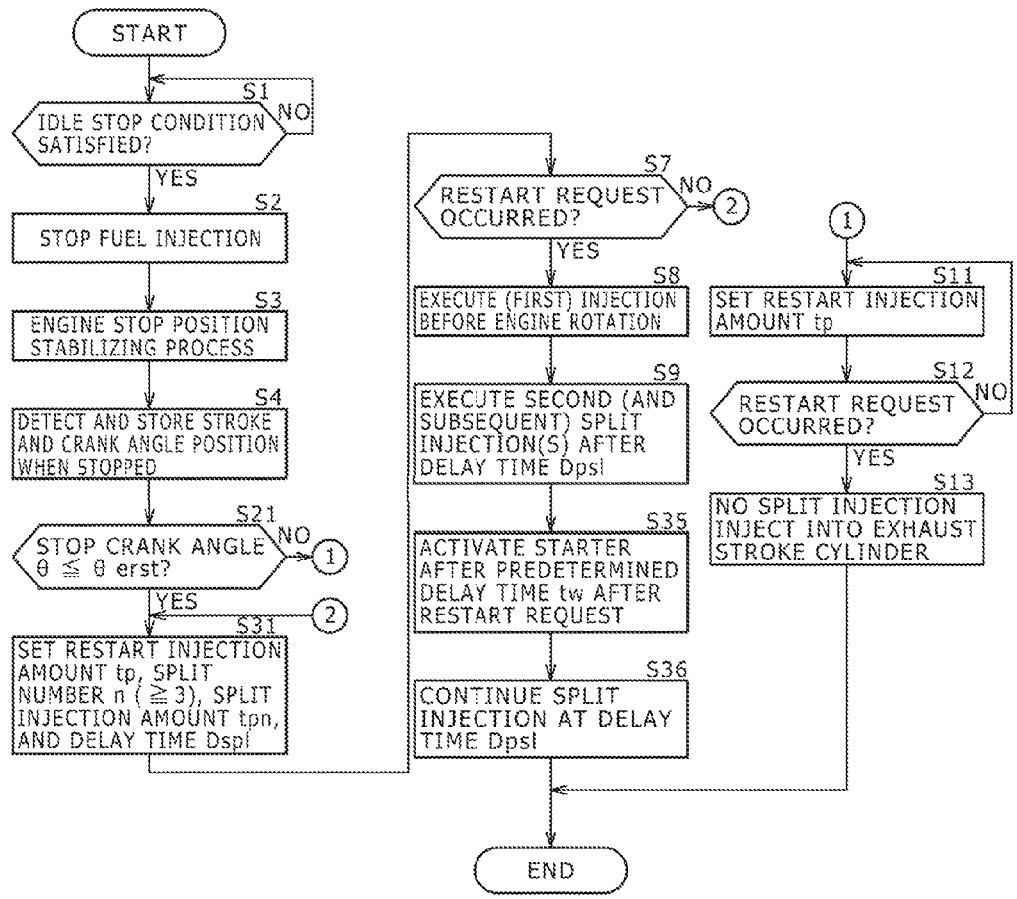
FIG. 5C is a flow chart of the third and fifth embodiments.

FIG. 5C shows a flow of the embodiment in which a split injection is respectively performed before and after engine rotation, and the split number n is three times or more.

Step S1 to step S4, and step S21 are similar to those in FIG. 5B in that when a predetermined idle stop condition is satisfied, fuel injection is stopped in order to automatically stop the internal combustion engine. Then, after having executed a process of stabilizing the engine stop position, the inlet stroke stopped cylinder is determined, and the piston position (crank angle position) thereof is detected and stored. Then, it is determined whether the crank angle θ of the inlet stroke stopped cylinder is less than or equal to the limit crank angle θerst at which an effective split injection can be performed after engine rotation at the time of restarting.

If it is determined in step S21 that the crank angle θ of the inlet stroke stopped cylinder is less than or equal to the limit crank angle θerst, use of the split injection method is determined and control proceeds to step S31. In step S31, a restart time injection amount tp is set based on water temperature, and a split number n, a split injection amount tpn of each injection, and a delay time Dspl which serves as an injection interval time are calculated based on the crank angle θ of the inlet stroke stopped cylinder.

Specifically, based on the piston position (crank angle position) of the inlet stroke stopped cylinder as described above, an amount of time required from the moment when the restart request is detected to the moment when the air-fuel mixture suction limit crank angle θitend is reached is predicted, and the above respective values are set so that split injections can be completed within this predicted amount of time.

In the third embodiment shown in FIG. 3A, the split injection amount tpn of each injection is set equal (tpn=tp/n), and the delay time Dspl between the respective split injections is also set equal. On the other hand, in the fifth embodiment shown in FIG. 4A, it is preferable that the split injection amount tpn is set higher for an earlier injection, and regarding the delay time Dspl, this is set higher for an injection interval at earlier timing.

Subsequently, control proceeds to step S32 in which it is determined whether an engine restart request has occurred in a state in which the engine automatically stopped.

If it is determined in step S32 that a restart request has occurred, control proceeds to step S33, and a fuel injection before engine rotation stop (first injection) is commenced.

In step S34, after completion of the first injection before engine rotation, the second fuel injection after engine rotation is performed after the delay time Dspl has elapsed, and subsequently, there is repeated control in which after completion of each injection, the next split injection is commenced after the delay time Dspl has elapsed.

In step S35, after the restart request has occurred, the starter is activated after a predetermined delay time tw has elapsed, and engine start (cranking) is commenced.

In step S36, also after restarting, there is continued the control of split injections at the above delay time Dspl intervals, until injection ends within the air-fuel mixture suction limit crank angle θitend.

Moreover, if it is determined in step S21 that the crank angle θ of the inlet stroke stopped cylinder is greater than the limit crank angle θerst, as with the case of FIG. 5B, it is judged that split injection cannot be performed in this cylinder. Then, a restart time injection amount is set in step S11, and after having determined the restart request being satisfied in step S12, in step S13, the set restart time injection amount of fuel is injected into the cylinder which has been stopped in the exhaust stroke.

Furthermore, FIG. 5C may be applicable to a configuration in which a total of two split injections are performed, that is to say, a single split injection is performed respectively before and after engine rotation.

Figure 5D:
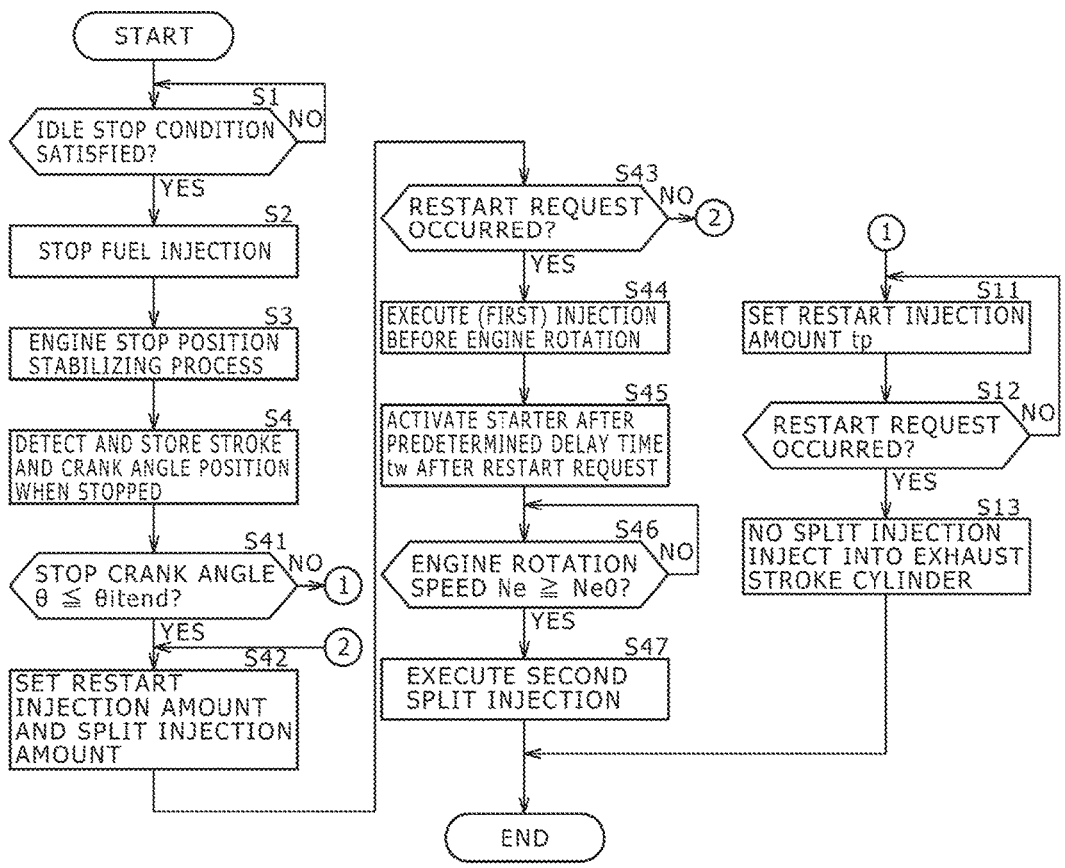
FIG. 5D is a flow chart of the sixth embodiment.

FIG. 5D shows a flow of the embodiment (the fifth embodiment shown in FIG. 4A) in which the timing of commencing the second split injection after engine rotation is set at the moment when the engine rotation speed reaches a predetermined value.

Step S1 to step S4 are similar to those in FIG. 5A to FIG. 5C in that when a predetermined idle stop condition is satisfied, fuel injection is stopped in order to automatically stop the internal combustion engine, and after having executed a process of stabilizing the engine stop position, the inlet stroke stopped cylinder is determined and the piston position thereof (crank angle position) is detected and stored.

In step S41, in a case in which the crank angle θ of the inlet stroke stopped cylinder is such that the second split injection is commenced when the engine rotation speed Ne has reached a predetermined value Ne0 after restarting, it is determined whether this split injection can be completed within the air-fuel mixture suction limit crank angle θitend.

If it is determined that the injection can be completed within the air-fuel mixture suction limit crank angle θitend, control proceeds to step S42 to perform split injections.

In step S42, a restart time injection amount and a split injection amount are set.

If it is determined in step S43 that a restart request has occurred, control proceeds to step S44, and a fuel injection before engine rotation stop (first injection) is commenced.

In step S45, after the restart request has occurred, the starter is activated after a predetermined delay time tw has elapsed, and engine start (cranking) is commenced.

In step S46, it is determined whether the engine rotation speed Ne has reached the predetermined value Ne0 or a greater value after the engine has been restarted. The predetermined value Ne0 is set to a value at which the inlet air flow velocity in the cylinder has increased due to the increase in the engine rotation speed Ne, and the effect of in-cylinder diffusion of the injected spray is high.

In step S46, if it is determined that the engine rotation speed Ne has reached the predetermined value Ne0 or a greater value, control proceeds to step S47 and the second split injection is commenced.

On the other hand, in step S41, in a case in which the second split injection is commenced at an engine rotation speed Ne greater than or equal to the predetermined value Ne0, if it is determined that this injection may not be completed within the air-fuel mixture suction limit crank angle θitend, a restart time injection amount is set in step S11, and after having determined the restart request being satisfied in step S12, in step S13, the set restart time injection amount of fuel is injected into the cylinder which has been stopped in the exhaust stroke.

Moreover, control may proceed to step S21 and the subsequent steps of FIG. 5B if the second split injection has been commenced at an engine rotation speed Ne greater than or equal to the predetermined value Ne0 in step S41. In this case, if the crank angle θ of the inlet stroke stopped cylinder is less than or equal to the limit crank angle θerst, split injections can be executed.

FIG. 5E shows a flow of a seventh embodiment in which a restart request after a warm-up completion is judged, and fuel injection control at the time of restarting is executed as described in the respective embodiments of FIG. 5A to FIG. 5D.

In step S51, it is determined whether a start commencing operation has been performed by an engine start switch (such as an ignition switch or a push-type start button).

If no start commencing operation has been performed, control proceeds to step S57 in which it is determined whether the engine is stopped by an OFF operation of the engine start switch. If YES, control proceeds to step S58 in which the cylinder in the inlet stroke is determined based on a signal from the crank angle sensor 117 in an engine stop state, and the piston position of the inlet stroke stopped cylinder (crank angle position) is detected and stored into the backup memory. If the determination result of step S57 is NO, this flow ends.

On the other hand, if it is determined in step S51 that a start commencing operation has been performed by the engine start switch, control proceeds to step S52 and detection values of engine temperature (engine cooling water temperature, lubricating oil temperature, and the like) are read.

In step S53, it is determined whether the engine temperature is below the warm-up completion temperature.

If it is determined as being a low-temperature start at an engine temperature below the warm-up completion temperature, control proceeds to step S54 in which the starter is activated to commence cranking, and a cylinder determination is performed based on a signal from the crank angle sensor 117. This cylinder determination is performed in a manner such that the result stored in step S58 is cleared and a determination is made again.

Since the vaporizability of fuel becomes lower and the amount of fuel which becomes attached to the inlet air passage wall increases when the engine temperature is lower, in step S55, the fuel injection amount is increase-corrected and fuel injection is executed in the exhaust stroke (normal low-temperature injection amount control).

On the other hand, if it is determined in step S54 that the engine temperature is greater than or equal to the warm-up completion temperature, a warm-up start is performed under a condition similar to that at the time of restarting after an idle stop, and therefore there is performed control similar to any one of the respective embodiments shown in FIG. 5A to FIG. 5D (step S5 and subsequent steps in FIG. 5A, step S21 and subsequent steps in FIGS. 5B and 5C, and step S41 and subsequent steps in FIG. 5D).

According to the seventh embodiment, also at the time of performing warm-up start with an engine start switch operation performed by the driver, there is obtained the operation and effect of the corresponding embodiment among the first to sixth embodiments described above.

Moreover, although the seventh embodiment may be practiced in combination with the first to sixth embodiments at the time of a start request after automatic stop is performed, the seventh embodiment can of course be independently practiced on a vehicle in which automatic stop such as idle stop is not performed.

In the embodiment described above, split injections can be easily performed a plurality of number of times before engine rotation, by setting a split number n1 before engine rotation, each split injection amount tpn1, and a delay time Dspl1 with respect to the injection amount before engine rotation. Split injections after engine rotation may also be performed a plurality of number of times, and a split number n2 after engine rotation, each split injection amount tpn2, and a delay time Dspl2 are similarly set with respect to the injection amount after engine rotation. Furthermore, when the engine rotation speed Ne has reached the predetermined value Ne0 and injection has been commenced in step S41, it may be determined whether the final injection can be completed within the air-fuel mixture suction limit crank angle θitend, and it may be executed if this injection completion is possible.

Furthermore, in the above embodiment, when a split injection is performed in the initial cycle for the inlet stroke stopped cylinder, at the same time, the restart time injection amount of fuel is injected into the cylinder stopped in the exhaust stroke immediately after a restart request has been made. Subsequently, injection is commenced for the cylinder in the exhaust stroke at a predetermined injection commencing timing. However the control is switched after the second cycle, or once engine rotation has been stabilized after a complete explosion, so that the injection completion timing becomes constant.

Moreover, as has been described, an injection before engine rotation contributes to cooling of air inside the inlet port while an injection after engine rotation contributes to uniformity of air-fuel mixture inside the cylinder, and these injections respectively have an effect of suppressing pre-ignition. Consequently, with a long stroke engine or an engine having a tumble control valve added thereto and having a comparatively high gas flow and a high level of air-fuel mixture uniformity in the cylinders, the entire injection amount may be split-injected only before engine rotation as with the first embodiment. Moreover, with an engine in which the injection amount before engine rotation is made relatively high to enhance the cooling capability, and air-fuel mixture uniformity in the cylinders is low, the injection amount after engine rotation may be made relatively high so as to enhance the uniformity.

Furthermore, in order to improve startability, there may also be used in combination a control in which the inlet valve closing timing is controlled to a most retarded position to reduce the compression pressure, using variable valve timing mechanism 201 at the time of idle stop.

Figure 8:
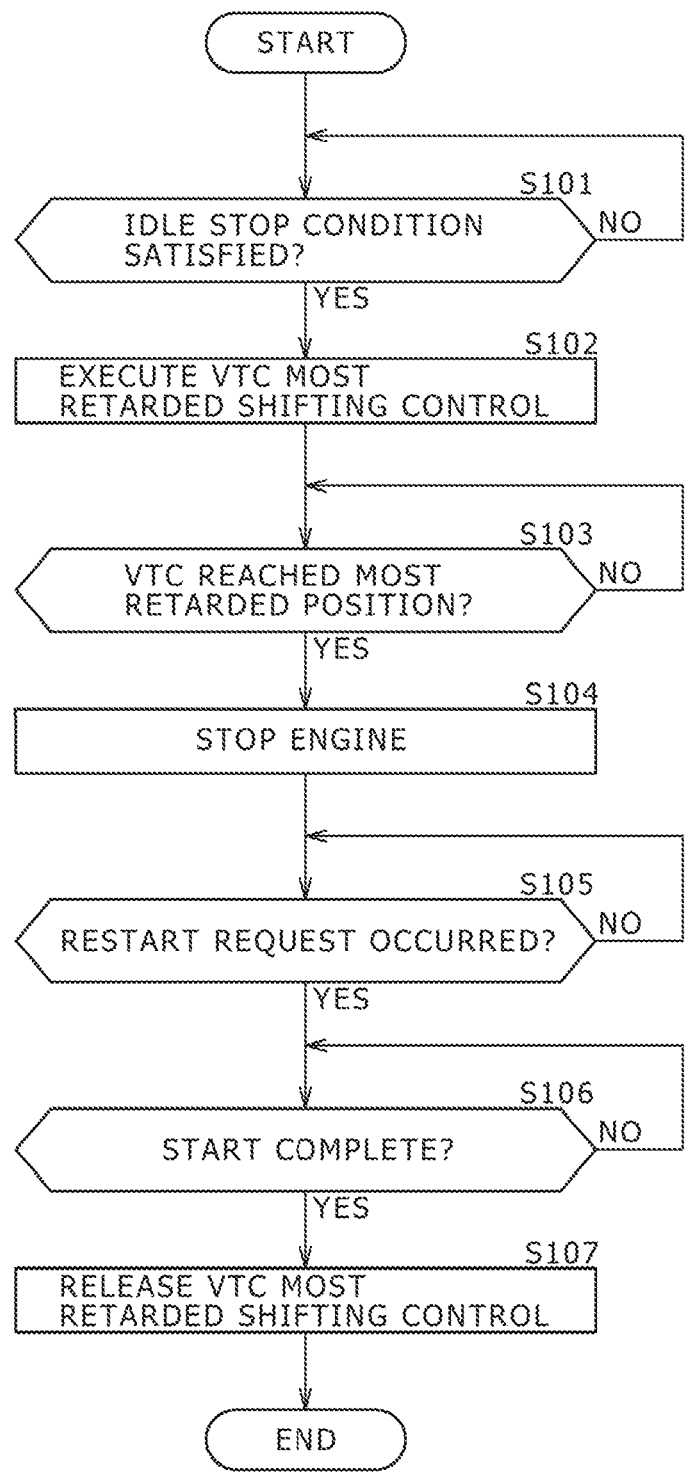
FIG. 8 is a flow chart of valve closing timing control of an inlet valve when the internal combustion engine is automatically stopped.

FIG. 8 shows a flow chart of valve closing timing control of the above inlet valve.

In step S101, it is determined whether an idle stop condition is satisfied. If satisfied, control proceeds to step S102 in which the valve timing of the inlet valve is made most retarded by variable valve timing mechanism (VTC) 201, thereby executing control to make inlet valve closing timing (IVC) retarded to the greatest possible extent.

Moreover, in a case of mechanically driving to be most retarded, by stopping power distribution to a control actuator of variable valve timing mechanism 201, power distribution to the control actuator may be stopped to thereby shift the valve timing of the inlet valve to the most retarded side.

Furthermore, it is preferable that variable valve lift mechanism 112 executes control so that the lift amount and operating angle of the inlet valve are on the greater side (where the lift amount is maximum for example).

Here, by using the most retard control of the valve timing performed by variable valve timing mechanism 201 in combination with the inlet valve operating angle control of variable valve lift mechanism 112, IVC can be made further retarded, and it becomes possible to expand the range of IVC control required for pre-ignition suppression.

In this case, the control actuator of variable valve lift mechanism 112 is driven until at least the engine is stopped, and thereby the high lift amount side of the inlet valve is retained.

Moreover, power distribution may be performed even when the engine is in the stop state, in order to continue to drive the control actuator of variable valve lift mechanism 112. Furthermore, power distribution may be stopped when the engine has been stopped and it may be restored when an automatic start request is made.

In step S103, it is determined whether the valve timing of the inlet valve has been shifted to the most retarded position by variable timing mechanism 201, and this control continues to be performed until it is determined as having been shifted.

Whether or not the valve timing of the inlet valve has been shifted to the most retarded position can be determined when the actual advance displacement amount of variable valve timing mechanism 201 takes a value showing the most retarded position. This actual advance displacement amount can be calculated based on the rotational phase difference between the inlet cam shaft and the crank shaft.

After the engine has been stopped in step S104, a restart request occurs due to the determination in step S105, and the restart control described above is performed.

Then, in step S106, if the start completion is determined (for example, when the start switch is OFF and the engine rotation speed has reached a value corresponding to a complete explosion), in step S107, the control of bringing the valve timing of the inlet valve to the most retarded position is released, and the control is switched to employ a target valve timing of the inlet valve, which is set based on the engine operating state.

Figure 9:
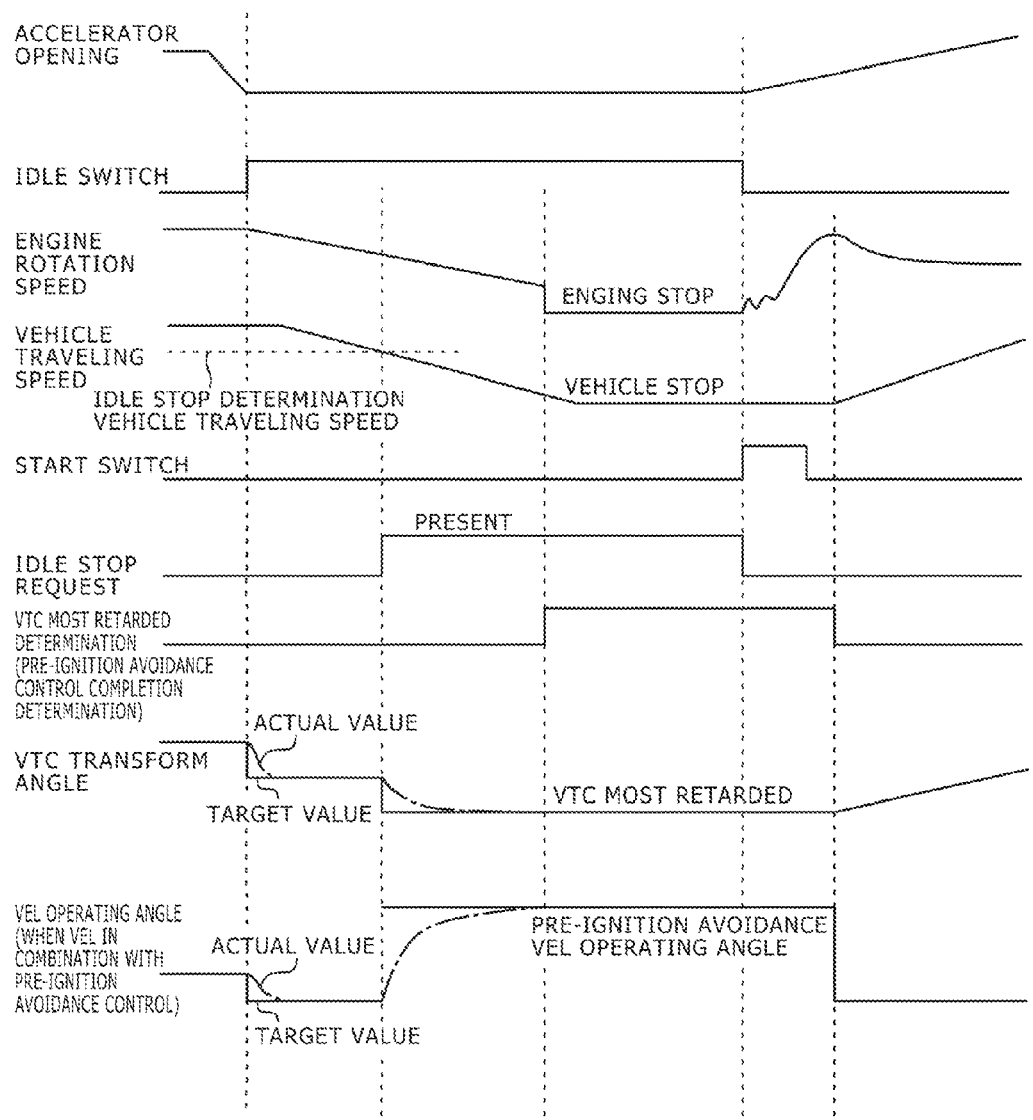
FIG. 9 is a time chart of valve closing timing control of the same inlet valve.

FIG. 9 shows a time chart of the above IVC control.

When the accelerator opening is reduced and the engine operation is brought to a deceleration idle state in which idle switch 116a is turned ON, the target value of the valve timing control of the inlet valve performed by variable valve timing mechanism (VTC) 201 is set to a retarded value according to the deceleration idle state, and the valve timing is retard-controlled so as to approach this target value.

Moreover, the target values of the lift amount and of the operating angle control of the inlet valve performed by variable valve lift mechanism (VEL) 112 are also set to values at which the operating angle is reduced according to the deceleration idle state, and a reduction-control is performed so that the lift amount and the operating angle approach these target values.

With these retardation control and reduction control of the lift amount and the operating angle of the inlet valve, the inlet valve opening timing is retarded, and the amount of valve overlapping with the exhaust valve is reduced. Consequently, combustion characteristics in the deceleration idle state can be maintained at a superior level.

When the vehicle traveling speed is reduced by the deceleration idle state, to a speed below an idle stop determination vehicle traveling speed, and the idle stop condition is satisfied, the pre-ignition avoidance control is commenced as described above. As a result, the target value of the valve timing control of the inlet valve performed by variable valve timing mechanism (VTC) 201 is set to the most retarded position, and control is performed so that valve timing approaches the most retarded position.

On the other hand, in a case in which as described above, the pre-ignition avoidance control with variable valve lift mechanism 112 is used in combination, the target value is set so that the lift amount and operating angle of the inlet valve are on the greater side (where the lift amount is maximum for example), and increase-control is performed so that the lift amount and the operating angle approach the target values.

The most retard control of the valve timing of the inlet valve performed by variable valve timing mechanism 201 continues to be performed until the most retarded position, which is the target value, is determined as being reached. Moreover, in a case in which the pre-ignition avoidance control performed by variable valve lift mechanism 112 is used in combination, the control continues to be performed until it is determined that the lift amount and operating angle of the inlet valve have reached the target values. However, power distribution may be performed even when the engine is in a stop state in order to continue to drive the control actuator (state shown in the diagram), or power distribution may be stopped when the engine has been stopped and it may be restored when an automatic start request is made.

After the engine is stopped as described above, when an increase in the accelerator opening caused by a depressing operation of the accelerator pedal is detected and a restart request occurrence is detected, the start switch is turned ON and restarting (cranking) is commenced. As a result, when the engine rotation speed reaches a predetermined value or higher and causes the starter switch to turn OFF, and the engine rotation speed has reached a value corresponding to a complete explosion and start completion is determined, the most retard control of the valve timing of the inlet valve performed by variable valve mechanism 201 is released. Moreover, in a case in which the increase-control of the valve timing of the inlet valve performed by the variable valve lift mechanism 112 is used in combination, this control is also released and the control is switched to employ new target values, which are respectively set based on the engine operating state.

If there is performed the most retard control of the valve timing of the inlet valve performed by variable valve timing mechanism 201, or control which combines the most retard control of the valve timing of the inlet valve performed by variable valve timing mechanism 201 with the increase-control of the lift amount and operating angle of the inlet valve performed by variable valve lift mechanism 112, the inlet valve closing timing (IVC) is in a most retarded position at the time of restarting after the idle stop has been released. As a result compression pressure is reduced and startability of the engine can be further improved.

Furthermore, there is a fuel injection valve in which sprays injected from a plurality of injection nozzles are made to impinge on each other to thereby promote atomization of the fuel (refer to Japanese Patent No. 4099075).

The relevant parts structure and operation of the above fuel spray impingement type fuel injection valve is described, with reference to the drawings.

Figure 10A:
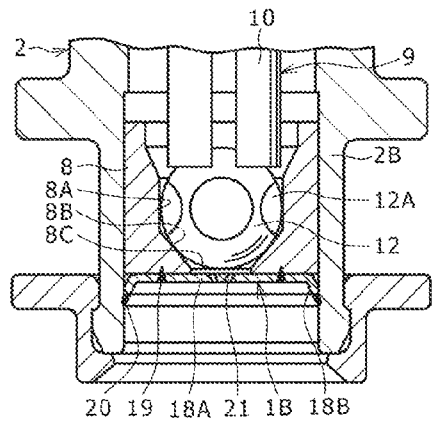
FIG. 10A is an enlarged view of a peripheral part of an injection nozzle hole of a spray impingement type fuel injection valve.
Figure 10B:
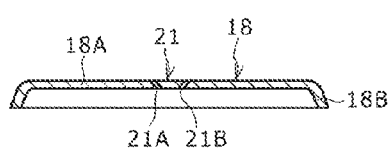
FIG. 10B is a cross-sectional view showing a nozzle plate in FIG. 10A alone.
Figure 10C:
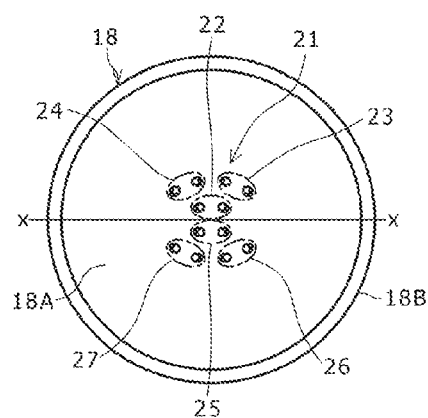
FIG. 10C is a plan view showing the nozzle plate alone.

As shown in FIG. 10A to FIG. 10C, a nozzle plate 18 provided so as to cover an injection nozzle 8C on a valve seat member 8 includes; a flat plate section 18A which is formed in a disk shape by applying press-working to a metallic plate for example, and a cylinder section 18B which is formed bent in a substantially L shape toward the outer periphery side of the flat plate section 18A.

Flat plate section 18A is joined with the tip end surface of valve seat member 8 by a welding section 19, and cylinder section 18B is joined with the inner circumferential surface of a small diameter cylinder section 2B of a valve casing 2 by a welding section 20.

Figure 10D:
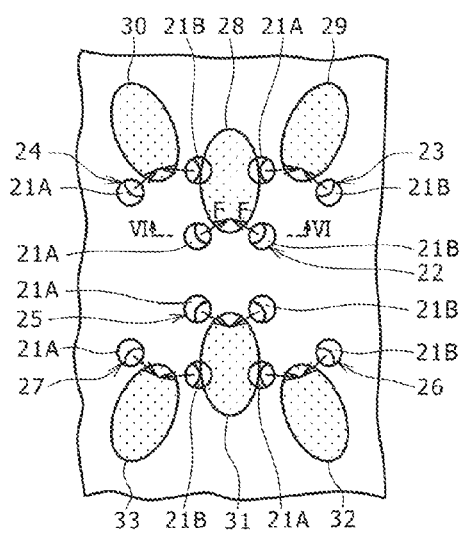
FIG. 10D is an enlargement view of a relevant part showing the respective nozzle hole pairs in FIG. 10C being operated in a fuel injection operation.

A plurality of nozzle holes 21 provided in flat plate section 18A of nozzle plate 18 are provided in a total of 12 locations in the center of flat plate section 18A as shown in FIG. 10C and FIG. 10D for example, and fuel inside casing 1 is injected therefrom when a valve body 9 is open.

Here, the respective nozzle holes 21 form six nozzle hole pairs 22, 23, 24, 25, 26, and 27 respectively having a pair of two adjacent nozzle holes 21A and 21B, and nozzle hole pairs 22, 23, and 24 and nozzle hole pairs 25, 26, and 27 are arranged line-symmetric about the X-X axis which passes through the center of nozzle plate 18. First nozzle hole pairs 22 and 25 among these nozzle hole pairs 22, 23, 24, 25, 26, and 27 are arranged along the X-X axis in the vicinity of the X-X axis as shown in FIG. 10D, and second nozzle hole pairs 23, 24, 26, and 27 are arranged in positions different in the circumferential direction of nozzle plate 18 from those of first nozzle hole pairs 22 and 25 and distanced from the X-X axis further than first nozzle hole pairs 22 and 25 to the outer periphery side of nozzle plate 18.

Figure 10E:
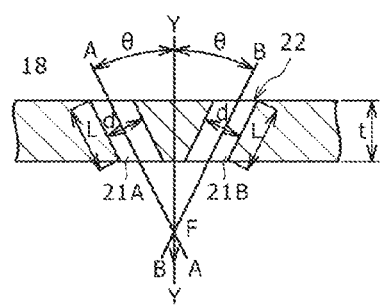
FIG. 10E is an enlarged cross-sectional view of each nozzle hole, which constitutes the nozzle hole pair, seen from the direction illustrated with arrows VI-VI in FIG. 10D.

Nozzle holes 21A and 21B which form the respective nozzle hole pairs 22 to 27 are of a configuration such that as shown in FIG. 10E, the hole centers A-A and B-B thereof are respectively inclined only by an angle θ with respect to the Y-Y axis orthogonal to flat plate section 18A of nozzle plate 18, and they intersect with each other in a V shape about the Y-Y axis.

As a result, each of nozzle hole pairs 22 to 27 is configured as an impingement type nozzle hole pair in which injection flows of fuel injected from the respective nozzle holes 21A and 21B in the direction shown with arrows F impinge on each other on the forward side in the injection directions. The spray of fuel after the impingement caused by first nozzle hole pairs 22 and 25 forms spray patterns 28 and 31 shown in FIG. 10D. Moreover, the spray of fuel after the impingement caused by second nozzle hole pairs 23, 24, 26, and 27 form other spray patterns 29, 30, 32, and 33, the spraying directions of which are different from those of spray patterns 28 and 31 formed by first nozzle hole pairs 22 and 25.

Nozzle hole pairs 22 to 27 atomize the fuel by causing the injection flows of fuel injected from nozzle holes 21A and 21B to impinge on each other, and inject this fuel to the outside in spray patterns 28, 29, 30, 31, 32, and 33 shown in FIG. 10D. At this time, spray patterns 28, 29, 30, 31, 32, and 33 respectively have different spraying directions so as to be line-symmetric about the X-X axis as shown in FIG. 10D.

Here, in this embodiment, as shown in FIG. 10E, the dimensional ratio t/d between the plate thickness t of nozzle plate 18 (flat plate section 18A) and the hole diameter d of nozzle holes 21A and 21B is set so as to satisfy a relationship $t/d \geq 1.0$.

As a result, the length L of nozzle holes 21A and 21B provided in nozzle plate 18 can be made long, so that straight progression of the injection flow can be ensured when injecting fuel in the arrow F direction from each of nozzle holes 21A and 21B.

Therefore, in the provided configuration, atomization of the fuel can be promoted by making the injection flows injected from nozzle holes 21A and 21B of the respective nozzle hole pairs 22 to 27 appropriately impinge on each other, and spray patterns 28 to 33 from nozzle hole pairs 22 to 27 can be expanded extensively.

With use of this spray impingement type fuel injection valve, impingement between sprays promotes fuel atomization and the spray patterns expand extensively, and consequently the penetration force becomes reduced. Therefore, the atomized fuel spray, in particular, the fuel spray injected before engine rotation in the inlet stroke stopped cylinder, efficiently cools the inlet port wall and the air-fuel mixture within the inlet port while spray adhesion to the inlet valve is being suppressed, and the cooling effect thereof within a cylinder when sucked into the cylinder can be increased and the effect of suppressing pre-ignition can be increased.

Moreover, atomization of the fuel can be further promoted by increasing the fuel pressure supplied to the fuel injection valve at the time of restarting.

Figure 11:
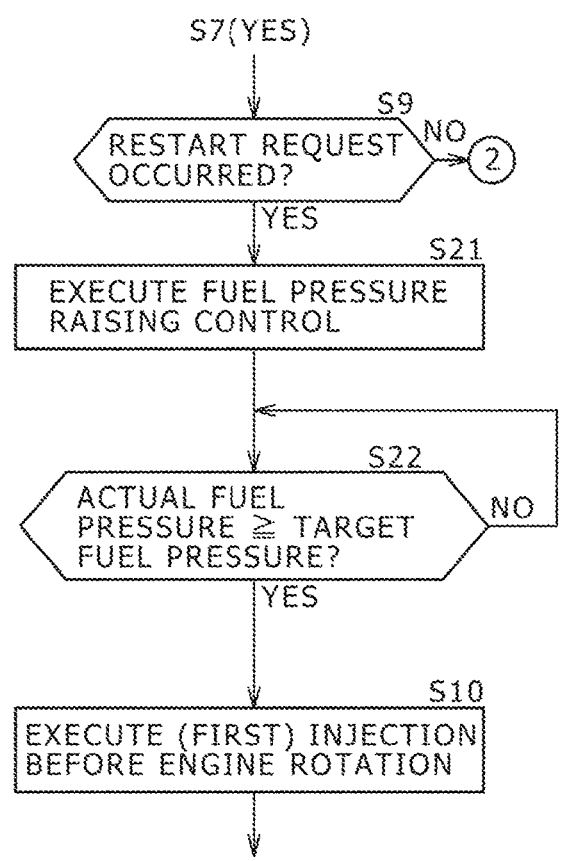
FIG. 11 is a flow chart showing a relevant part of fuel pressure raising control at the time of restarting.

FIG. 11 shows a flow of a relevant part of a fuel pressure raising control at the time of restarting. In step S9 in the flow chart of FIG. 5A, when a restart request occurrence has been determined, control proceeds to step S21 and fuel pressure raising control is executed. For example, it is possible to raise the fuel pressure to be supplied to the fuel injection valve by increasing pump rotation speed from that at the time of idle operating by changing the battery, which supplies electric power to an electric fuel pump (not shown in the drawing), from normal lead battery 121 to lithium-ion battery 122.

Next, in step S22, it is determined whether the actual fuel pressure detected by a fuel pressure sensor (not shown in the drawing) has reached a target fuel pressure. After it has been reached, control proceeds to step S10 and the first fuel injection before engine rotation is executed in the inlet stroke stopped cylinder. Other steps are similar to those in FIG. 5A.

Furthermore, when automatically stopping the internal combustion engine, if fuel pressure raising control is performed before the engine is stopped, to increase the fuel pressure within the fuel tubing, the amount of time required for the fuel pressure to reach the target fuel pressure is reduced when performing the fuel pressure raising control at the time of restarting, and the commencement of the first injection before engine rotation can be performed earlier, accordingly allowing prolonged vaporization time.

Although not shown in the drawing, fuel consumption may be improved by changing the fuel pump power supply source to a lead battery to reduce the fuel pressure to the normal fuel pressure, after starting has been completed (complete explosion).

If this fuel pressure raising control at the time of restarting is used in combination with the spray impingement type fuel injection valve, improved atomization increases the cooling effect within the cylinder and the effect of suppressing pre-ignition can be further increased. However, even if this is applied to a system which uses a normal fuel injection valve (non-spray-impingement type), it is of course possible to increase the effect of suppressing pre-ignition.

The entire contents of Japanese Patent Application No. 2009-282946 filed on Dec. 14, 2009 a priority of which is claimed, are incorporated herein by reference.

While only selected embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

What is claimed is:

1. An apparatus for controlling fuel injection of an internal combustion engine for a vehicle comprising:
   a fuel injection valve arranged so as to inject fuel to an inlet port of each cylinder of the internal combustion engine; and
   a control unit which controls driving of the fuel injection valve comprising:
   an inlet stroke stopped cylinder determination section which determines a cylinder stopped in an inlet stroke when the internal combustion engine is stopped;
   a start request detection section which detects a start request of the internal combustion engine; and
   a start-commencement cylinder injection control section which, when starting the engine upon detection of the start request, splits fuel injection of the initial cycle to the cylinder, which has been determined as being stopped in the inlet stroke when the internal combustion engine was stopped before starting, into a plurality of injections to thereby perform injections, so that the fuel is injected respectively before and after engine rotation.

2. An apparatus according to claim 1,
wherein the control unit further comprises:
an automatic engine stop section which stops fuel injection when the vehicle stops to thereby automatically stop the operation of the internal combustion engine; and
the inlet stroke stopped cylinder determination section determines a cylinder which has been stopped in an inlet stroke when the internal combustion engine is automatically stopped;
the start request detection section detects a start request of the internal combustion engine, which has been automatically stopped; and
the start-commencement cylinder injection control section, when starting the engine upon detection of the start request after the internal combustion engine has been automatically stopped, splits fuel injection of the initial cycle to the cylinder, which has been automatically stopped in the inlet stroke, into a plurality of injections to thereby perform injections, so that the fuel is injected respectively before and after engine rotation.

3. An apparatus according to claim 1, further comprising:
an engine temperature detector which detects an engine temperature; and
the control unit further comprises:
a warm-up completion state determination section which determines a warm-up completion state in which the detected engine temperature is greater than or equal to a predetermined temperature; and
the start-commencement cylinder injection control section, when starting the engine upon the start request detection in the determined warm-up completion state, splits fuel injection of the initial cycle to the cylinder, which has been determined as being stopped in the inlet stroke when the internal combustion engine was stopped before starting, into a plurality of injections to thereby perform injections, so that the fuel is injected respectively before and after engine rotation.

4. An apparatus according to claim 3, wherein
the control unit is separately formed as:
a fuel control unit which controls driving of the fuel injection valve; and
an automatic stop control unit which outputs; an automatic stop request which stops driving the fuel injection valve when the vehicle is stopped to thereby automatically stop the operation of the internal combustion engine, and a start request of the internal combustion engine which has been automatically stopped, to the fuel control unit, and
the fuel control unit comprises:
a fuel injection valve drive stop section which stops fuel injection based on a start request signal from the automatic stop control unit to thereby stop the operation of the internal combustion engine;
an inlet stroke cylinder determination section which determines a cylinder stopped in an inlet stroke when the internal combustion engine is automatically stopped; and a start-commencement cylinder injection control section which, when starting the engine based on the start request, splits fuel injection in an initial cycle to a cylinder stopped in the inlet stroke, into a plurality of injections to thereby perform injections, so that the fuel is injected respectively before and after engine rotation.

5. An apparatus according to claim 1, wherein the start-commencement cylinder injection control section completes the fuel injections after engine rotation before a timing by which an operation of air-fuel mixture suction into the cylinder is completed in the inlet stroke.

6. An apparatus according to claim 5, wherein the start-commencement cylinder injection control section sets injection intervals of the plurality of fuel injections, based on a remaining period of time in an inlet stroke in a cylinder which has been stopped in the inlet stroke.

7. An apparatus according to claim 1, wherein if a remaining period of time of the inlet stroke of a cylinder which has been stopped in the inlet stroke is determined as being within a predetermined period of time, the start-commencement cylinder injection control section injects before engine rotation, instead of the fuel injection of the initial cycle of the cylinder, a fuel injection amount of the initial cycle, to a cylinder which will undergo an inlet stroke after this cylinder.

8. An apparatus according to claim 1, wherein the internal combustion engine further comprises:
a variable valve actuation mechanism which can at least change a closing timing of an inlet valve, and
when a closing timing of an inlet valve of a cylinder which is stopped in the inlet stroke is set to a retarded side of an inlet bottom dead center by the variable valve actuation mechanism, the start-commencement cylinder injection control section sets an injection completion timing of a final injection after engine rotation, to a timing before the inlet bottom dead center.

9. An apparatus according to claim 1, wherein the start-commencement cylinder injection control section controls an injection commencing timing of fuel injection after engine rotation, based on an engine rotation speed.

10. An apparatus according to claim 1, wherein the start-commencement cylinder injection control section performs control so that an injection period of an earlier fuel injection is made longer than an injection period of a later fuel injection.

11. An apparatus for controlling fuel injection of an internal combustion engine for a vehicle comprising:
a fuel injection valve arranged so as to inject fuel to an inlet port of each cylinder of the internal combustion engine;
a start request detection means which detects a start request of the internal combustion engine;
an inlet stroke stopped cylinder determination means which determines a cylinder stopped in an inlet stroke when the internal combustion engine is stopped;
a start request detection means which detects a start request of the internal combustion engine; and
a start-commencement cylinder injection control means which, when starting the engine upon detection of the start request, splits fuel injection of the initial cycle to the cylinder, which has been determined as being stopped in the inlet stroke when the internal combustion engine was stopped before starting, into a plurality of injections to thereby perform injections, so that the fuel is injected respectively before and after engine rotation.

12. A method of controlling fuel injection of an internal combustion engine for a vehicle, the method comprising the steps of:
injecting fuel from a fuel injection valve arranged in an inlet port of each cylinder of the internal combustion engine;
determining a cylinder which has been stopped in an inlet stroke when the internal combustion engine is stopped;
detecting a start request of the engine; and
controlling the fuel injection valve so that, when starting the engine upon detection of the start request, fuel injection of the initial cycle to the cylinder, which has been determined as being stopped in the inlet stroke when the internal combustion engine was stopped before starting, is split into a plurality of injections to thereby perform injections, so that the fuel is injected respectively before and after engine rotation.

13. A method according to claim 12, the method further comprising the steps of:
stopping fuel injection when the vehicle stops, to thereby automatically stop the operation of the internal combustion engine; and
in the step of determining a cylinder, determining the cylinder which has been stopped in the inlet stroke when the internal combustion engine is automatically stopped;
in the step of detecting the start request, detecting a start request of the internal combustion engine, which has been automatically stopped; and
in the step of controlling the fuel injection valve, when starting the engine upon detection of the start request after the internal combustion engine has been automatically stopped, splitting fuel injection of the initial cycle to the cylinder, which has been automatically stopped in the inlet stroke, into a plurality of injections to thereby perform injections, so that the fuel is injected respectively before and after engine rotation.

14. A method according to claim 12, the method further comprising the steps of:
detecting an engine temperature; and
determining a warm-up completion state in which the detected engine temperature is greater than or equal to a predetermined temperature, and
in the step of controlling the fuel injection valve, when starting the engine upon the start request detection in the determined warm-up completion state, splitting fuel injection of the initial cycle to the cylinder, which has been determined as being stopped in the inlet stroke when the internal combustion engine was stopped before starting, into a plurality of injections to thereby perform injections, so that the fuel is injected respectively before and after engine rotation.

15. A method according to claim 14, wherein in the step of controlling the fuel injection valve, the fuel injections after engine rotation, are completed before a timing by which an operation of air-fuel mixture suction into the cylinder is completed in the inlet stroke.

16. A method according to claim 14, wherein
in the step of controlling the fuel injection valve, if a remaining period of time of the inlet stroke of a cylinder which has been stopped in the inlet stroke is determined as being within a predetermined period of time, the start-commencement cylinder injection control section injects before engine rotation, instead of the fuel injection of the initial cycle of the cylinder, a fuel injection amount of the initial cycle to a cylinder which will undergo an inlet stroke after this cylinder.

* * * * *